(12) United States Patent
Shahidinejad et al.

(10) Patent No.: US 10,989,416 B2
(45) Date of Patent: Apr. 27, 2021

(54) DAMPER FOR KITCHEN EXHAUST HOOD

(71) Applicant: Spring Air Systems Inc., Oakville (CA)

(72) Inventors: Soheil Shahidinejad, Oakville (CA);
Thomas E. Mills, Oakville (CA);
Joshua Gardner, Oakville (CA)

(73) Assignee: Spring Air Systems Inc., Oakville (CA)

( * ) Notice: Subject to any disclaimer, the term of this patent is extended or adjusted under 35 U.S.C. 154(b) by 156 days.

(21) Appl. No.: 16/297,980

(22) Filed: Mar. 11, 2019

(65) Prior Publication Data

US 2020/0292178 A1 Sep. 17, 2020

(51) Int. Cl.
*F24C 15/20* (2006.01)

(52) U.S. Cl.
CPC ...... *F24C 15/2021* (2013.01); *F24C 15/2042* (2013.01)

(58) Field of Classification Search
CPC .......................... F24C 15/2021; F24C 15/2042
USPC ....................................................... 126/289
See application file for complete search history.

(56) References Cited

U.S. PATENT DOCUMENTS

| | | | |
|---|---|---|---|
| 5,050,488 A * | 9/1991 | Beasley | F24F 1/0007 454/333 |
| 5,398,669 A * | 3/1995 | McCullough | F24B 1/1808 110/173 B |
| 5,609,522 A * | 3/1997 | Szwartz | F23L 13/02 110/162 |
| 6,349,716 B1 | 2/2002 | Morton | |
| 9,494,324 B2 | 11/2016 | Livchak et al. | |
| 9,958,168 B2 | 5/2018 | Robison et al. | |
| 10,082,299 B2 | 9/2018 | Livchak et al. | |
| 2005/0284713 A1* | 12/2005 | Fischer | F16F 15/02 188/266.7 |
| 2006/0090745 A1* | 5/2006 | Cormier | F23L 13/02 126/285 R |
| 2006/0278216 A1* | 12/2006 | Gagas | F24C 15/2028 126/299 D |
| 2008/0102743 A1* | 5/2008 | Williams | F24C 15/20 454/56 |

* cited by examiner

*Primary Examiner* — Avinash A Savani
(74) *Attorney, Agent, or Firm* — Patrick J. Hofbauer

(57) ABSTRACT

A damper assembly for use with an exhaust port in an upper wall of an exhaust hood comprises a mounting plate having a central opening, the mounting plate being attachable to the underside of the upper wall in overlying relation to the exhaust port. A damper plate is mounted on the mounting plate for pivotal movement about a pivot axis in a first rotational direction between a first limit position whereat the damper plate is fully removed from occluding the central opening and a second limit position whereat the damper plate occludes the central opening. A drive housing has a drive shaft drive extending therefrom for operative connection to the damper plate to drive the pivotal movement thereof. A damper actuator is mounted in the drive housing and connected to the drive shaft to effect bi-directional rotation of the drive shaft.

23 Claims, 16 Drawing Sheets

DAMPER FOR KITCHEN EXHAUST HOOD

FIELD OF THE INVENTION

The present invention relates generally to kitchen exhaust hoods such as are used over cooking appliances in commercial kitchens found in restaurants, schools, hospitals, food courts of large shopping centers and other institutions, and more particularly to damper assemblies utilized with such exhaust hoods.

BACKGROUND OF THE INVENTION

Kitchen exhaust hoods are well known for the purpose of exhausting smoke, steam, and particulate matter, including grease, which are produced in significant quantities in commercial kitchen environments, particularly where a plurality of cooking appliances are operating in proximity to each other. Such commercial exhaust hood systems often utilize a common fan to draw air from multiple exhaust hoods, or multiple exhaust hood sections positioned over the plurality of cooking appliances. Such systems requires a large amount of energy to operate, including energy to exhaust the air being removed from the cooking environment, as well as energy used to heat or cool fresh air brought into the environment to replace the exhausted air. In order to be safe and to meet local health, safety and fire code regulations, such systems must be designed to meet the demands of all of the cooking appliances operating thereunder at full load, although, in reality, the amount of actual full capacity cooking over a typical work day represents a relatively small part of the total time the system is in operation. That is, there are many times during a typical day when the cooking appliances are operating well below full capacity, and even some times when certain ones of the plurality of cooking appliances used under the exhaust hoods may be slowed down, or even completely shut down.

Energy efficient commercial exhaust hood systems have been developed to deal with these inefficiencies by regulating the amount of air exhausted from each exhaust hood/ hood section and, optionally, the amount of supplied back into the cooking environment, to match the amount of cooking load under each respective exhaust hood/hood section, at any particular time. This process, often referred to as "zone control" is typically accomplished in two ways: i) by modulating the speed of the exhaust fan connected to the exhaust hood/hood section; and, ii) by modulating the position of a variable flow damper mounted in an exhaust duct collar positioned atop the canopy of each exhaust hood/hood section to thereby vary the volume of exhausts air exiting the exhaust hood/hood section. Such systems typically modulate as aforesaid by utilizing a temperature sensor positioned in each exhaust duct leading from an exhaust hood/hood section and/or one or more temperature sensors mounted within the exhaust hood/hood section that may be spaced apart along the width of the canopy of each exhaust hood/hood section for respectively sensing operating temperatures at respective zones within that exhaust hood/hood section. Other sensors, such as air flow volume sensors, optical sensors or infrared sensors, may be additionally employed in such prior art systems. Such modulation may be mechanically or manually effected, but is most advantageously carried out automatically by means of an electronic controller having one or more suitably programmed central processing units ("CPU's) interconnected between the exhaust duct collar and the aforesaid sensors and further comprising one or more control panels interconnected to the CPU's and adapted for user review and input, said control panels preferably comprising one or more touchscreen video displays.

An example of a known fully automatic zone controlled commercial kitchen exhaust hood system of the general type described above is the Truflow-Zoneflow™ system available from Spring Air Systems Inc. of Oakville, Ontario Canada. Further details of this system are available from this company's website at: www:springairsystems.com Another automatic commercial zone controlled kitchen exhaust hood system of this general type is taught by U.S. Pat. No. 9,958,168 (Robison et al.), issued May 1, 2018, the contents of which are hereby incorporated by reference.

While these automatic prior art exhaust hood systems have utility in reducing the amount of energy consumed during a typical daily operating cycle as compared to earlier systems that run continuously at full capacity while activated, they fail to address one or more significant problems that continue to plague the prior art. That is, all of the automatic prior art exhaust hood systems referenced above utilize a variable flow damper that is positioned in a duct collar located above the canopy of the exhaust hood. This often means that the damper is located, in commercial buildings, above a non-structural false ceiling installed in the kitchen area. With such arrangements, access to the variable flow damper for purposes of repair, maintenance, cleaning or for monitoring its ongoing operation, is especially cumbersome and difficult, particularly where the space between the lower false ceiling and the structural ceiling above is restricted. Further, placement of the variable flow damper in the duct collar can make its installation and removal for cleaning or maintenance very difficult, particularly when dealing with support members for the false ceiling, the hood itself, and/or the surrounding ductwork. Moreover, periodic maintenance and cleaning is mandated by the building or fire codes of many jurisdictions as a preventative measure against fires, including fires caused by the buildup of grease in exhaust hoods, damper collars and their associated damper assemblies.

Another problem associated with prior art exhaust hood systems having a damper collar located above the canopy of the exhaust hood pertains to the height of the structural ceiling of the kitchen area necessary to accommodate installation of these systems. That is, the vertical height of many conventional damper collars is between about 12 and 24 inches. As the bottom of the hood canopy must be a minimum height above floor level to be functional for persons using the cooking appliances positioned therebelow, it is necessary that the structural ceiling above the exhaust hood (which may be the underside of a roof in a single story building, or the underside of a floor above the kitchen area in a multi-story building) must be positioned sufficiently high above the floor to accommodate installation above the exhaust canopy of both the damper collar and the ductwork connected thereabove. Such height comes at significant cost, having regard to the planning and construction costs required to provide same. This is especially the case in commercial installations where this extra height may extend beyond the cooking area to the remainder of the building in which the kitchen area is located.

Additionally, in prior art exhaust hood systems having damper collars positioned as aforesaid, the damper collars not only act as a rigid housing for the damper plates rotatably mounted therein, but also as a means for operatively connecting the canopy of the exhaust hood to the exhaust ductwork that extends away from the exhaust hood. As such, the damper collars must be made in a variety of different shapes, sizes and configurations to accommodate exhaust hoods and exhaust ductwork of correspondingly different shapes, sizes and configurations. This is so as smaller exhaust hoods require a proportionally smaller exhaust duct connected to the respective damper collar, and larger hoods require a proportionally larger exhaust duct connected thereto. This means, that for a manufacturer or supplier to offer its customers a full range of exhaust hoods of varying sizes and configurations for use in commercial kitchens for operative connection to ductwork of varying shapes, sizes and configurations, it is also necessary for that party to provide a correspondingly large range of damper collars of complimentary shapes, sizes and configurations. This not only increases the cost of manufacturing and inventorying a large number of different shapes, sizes and configurations of damper collars, but also complicates the supply chain logistics between such a manufacturer and its customers.

SUMMARY OF THE INVENTION

It is an object of the present invention to provide an improved damper assembly for use with a kitchen exhaust hood, and particularly with a commercial kitchen exhaust hood, which damper assembly overcomes or mitigates at least one of the above-noted difficulties associated with prior art damper assemblies for similar applications. This is achieved by replacing a conventional variable flow damper assembly positioned in a collar located above the canopy of the exhaust hood with the Applicant's new and inventive variable flow damper assembly that is mountable inside the canopy of the exhaust hood.

In accordance with one aspect of the present invention there is provided a damper assembly for use with an exhaust port formed in an upper wall of a kitchen exhaust hood to control the egress of exhaust gasses from said exhaust hood through said exhaust port. The damper assembly comprises a mounting plate having a central opening passing therethrough, with the mounting plate being removably attachable to the underside of the upper wall in sealed relationship thereto, with the central opening in fluid communication with the exhaust port. A variable position damper is mounted on the mounting plate for selective pivotal movement about a pivot axis in a first rotational direction between a first limit position, whereat the damper is fully removed from occluding the central opening so as to permit the free flow of the exhaust gasses through the exhaust port, towards a second limit position whereat the variable position damper fully occludes the central opening to substantially restrict the flow of exhaust the gas through the exhaust port, and in an opposite second rotational direction from the second limit position towards the first limit position. A drive housing is attached to the mounting plate and a drive shaft extends from the drive housing for operative connection to the variable position damper to drive the aforementioned pivotal movement of the damper in the first and second rotational directions upon respective bi-directional rotation thereof. A damper actuator is mounted in the drive housing to power the aforesaid bi-directional rotation of the drive shaft. A control means is interconnected with the damper actuator to selectively activate the damper actuator in a selected one of the first and second rotational directions. The damper actuator may have a mechanically powered drive mechanism or an electrically powered drive mechanism.

According to another aspect of the present invention, the exhaust hood defines a major axis, and the pivot axis is parallel to the major axis, with the variable position damper being mounted for said pivotal movement by means of an axle shaft affixed to the underside of said mounting plate.

According to yet another aspect of the invention, the axis of the drive shaft is coincident with the pivot axis and the drive shaft and the axle shaft are a continuous shaft extending from a drive housing mounted adjacent one end of the axle shaft to connect with the variable position damper so as to cause the aforesaid driving pivotal movement thereof.

According to still another aspect of the present invention, the damper actuator is electrically driven and the control means of the damper assembly additionally comprises one or more suitably programmed central processing units ("CPU's) interconnected with one or more temperature input sensors and with one or more user input touchscreen video displays.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
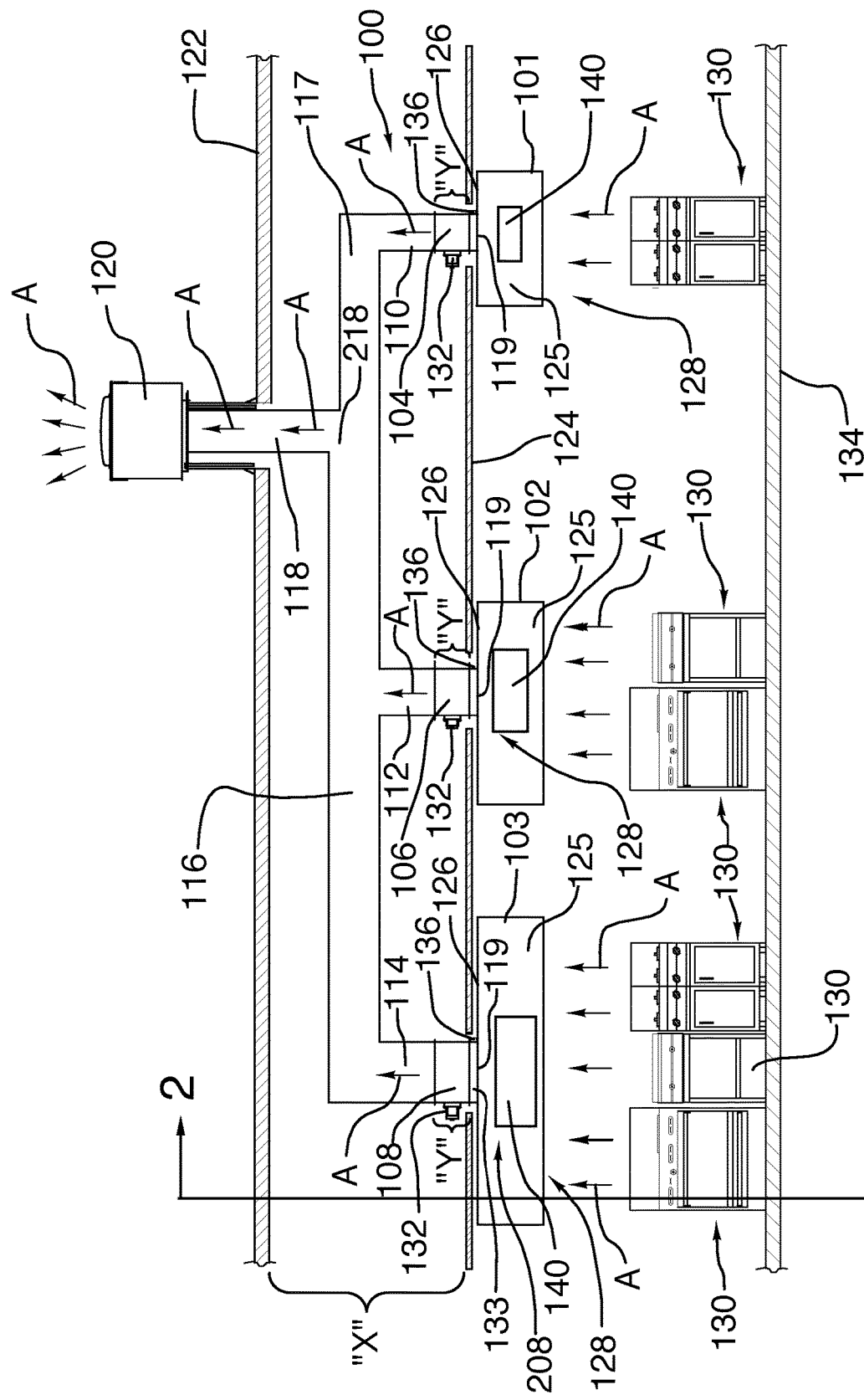
FIG. 1 is a diagrammatic front elevation of a prior art commercial kitchen exhaust hood system having 3 separate exhaust hoods.
Figure 2:
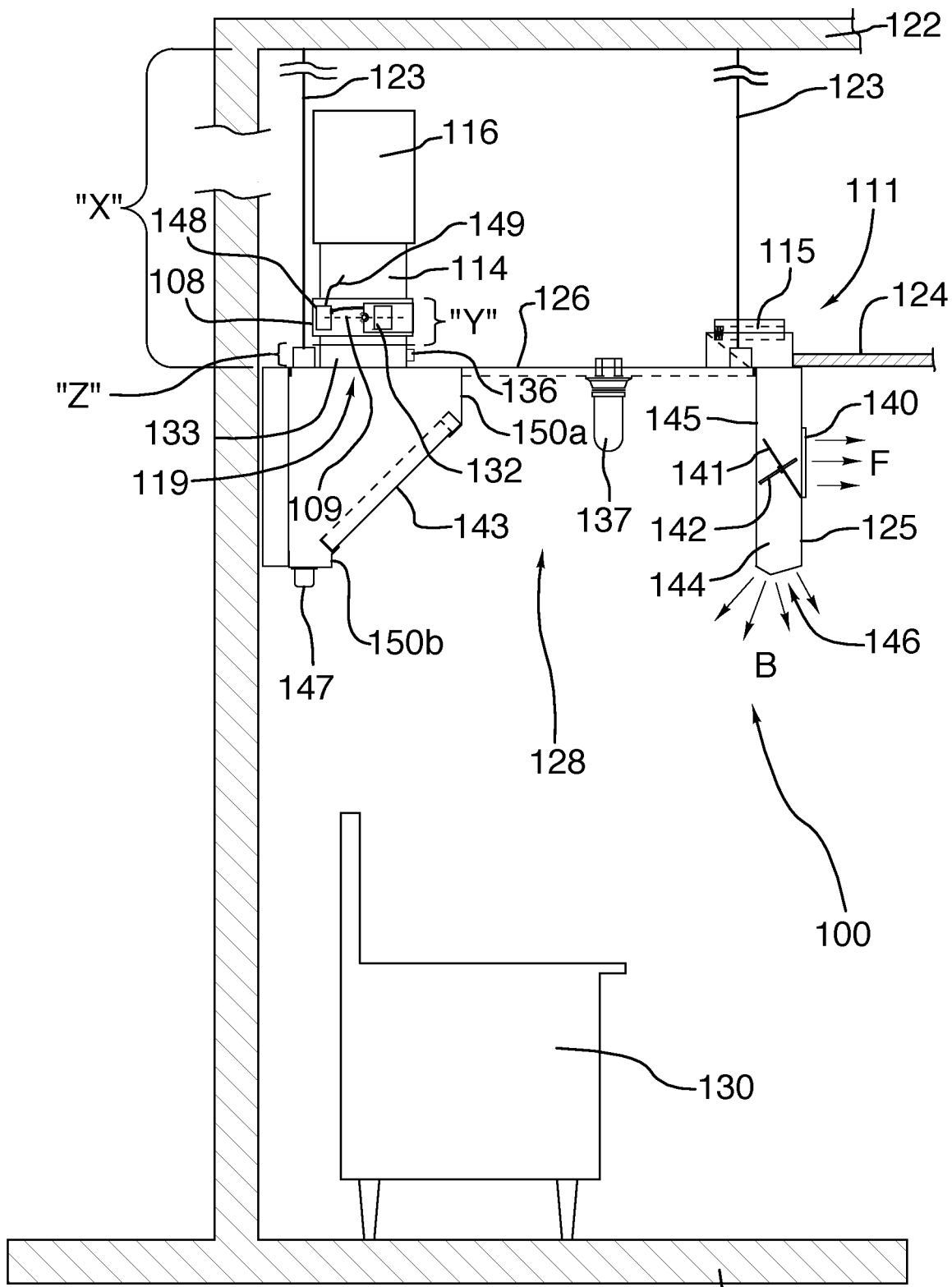
FIG. 2 is a sectional view of the prior art commercial kitchen exhaust hood system along sight line 2-2 of FIG. 1.

In FIGS. 1 and 2 of the drawings there is illustrated a prior art zone controlled commercial kitchen exhaust hood system 100 having three separate exhaust hoods 101, 102 and 103. The exhaust hoods 101, 102 and 103 are each operatively connected by respective exhaust damper collars 104, 106 and 108 to respective vertical ducts 110, 112 and 114, which ducts are in fluid communication with horizontal cross-duct sections 116, 117, which cross-duct sections 116, 117 connect by means of a vertical stack 118 passing through a roof structure 122 with an exhaust fan 120 mounted atop the roof structure 122.

The exhaust hoods 101, 102, 103, the vertical ducts 110, 112, 114, and the horizontal cross-duct sections 116, 117 are all typically suspended from, or otherwise attached to, the underside of the roof structure 122, or to an intervening floor structure in a multi-story building (not shown), by threaded hanger rods 123 or by any other conventional mounting means, such as, for example, metal strapping or the like (not shown), with the distance between the top surface 126 of the mounting hoods 101, 102 and 103 and the underside of the roof structure 122 being sufficient to accommodate the height of the vertical ducts 110, 112, 114, the height of the horizontal cross-duct sections 116, 117, and the height "Y" of the exhaust damper collars 104, 105 and 106.

The prior art zone-controlled commercial kitchen exhaust hood system 100 of FIGS. 1 and 2 may optionally include a conventional replacement air delivery system 111 to replace air exhausted by the exhaust hood system from the kitchen area with fresh outside air. The system shown comprises a conventional replacement air supply duct (not shown) that draws ambient air from outside the building in which the system 100 is installed and delvers it to a supply air duct connection collar 115 positioned on the top of the canopy 128 of each exhaust hood 101, 102, 103 adjacent its downwardly depending front wall 125. From the connection collar 115, the incoming supply air enters into a canopy replacement air duct 144 defined between the downwardly depending front wall 125 of the canopy 128 and an opposed downwardly depending intermediate wall 145 of the canopy. Replacement air entering the replacement air duct 144 can exit that duct by either a front facing replacement air grille 140 or a downwardly facing replacement portal 146. The amount of air exiting each of the front facing replacement air grille 140 and the portal 146 can be variably adjusted by the user manipulating the relative positions of a front delivery replacement air damper 141 and a downward delivery replacement air damper 142 each pivotally mounted for adjustable rotation in the canopy replacement air duct 144.

One or more lights 137 are advantageously mounted within the canopy 128 of each of the exhaust hood/hoods sections to improve visibility for those working on the cooking appliances positioned thereunder.

A decorative false ceiling, such as, for example, a wallboard ceiling, or a T-bar ceiling 124, may typically be suspended above a top surface 126 of each exhaust hood 101, 102 and 103, with the exhaust damper collars 104, 106 and 108 being positioned above the level of the false ceiling 124.

As best seen in FIG. 2, a variable positon exhaust damper plate 109 is pivotally mounted inside each of the exhaust damper collars 104, 106, 108 and is rotatably driven by a respective electrically driven damper actuator 132 mounted to a side of each damper collar 104, 106, 108. The damper actuator 132 is electrically connected to a junction box 148 mounted adjacent to it the side of each of the damper collars 104, 106, 108.

A flanged connection collar 133 of approximately 2-4 inches in vertical height is attached, as by continuous welding, to the top of the range hood, in aligned, fire sealed relation to a respective exhaust port 119 extending through an upper wall 126 of each exhaust hood 101, 102 and 103, through which exhaust port 119 exhaust gasses produced during operation of cooking appliances 130 positioned on floor 134 below the exhaust hoods 101, 102 and 103 are extracted upon operation of the exhaust fan 120, as indicated by arrows "A". Each flanged connection collar 133 has its top perimeter flange attached by, for example, continuous welding, to a complimentary flange projecting transversely from the bottom edge of each of the damper collars 104, 106, 108.

The damper collars 104, 106 and 108 not only serve as a connection means at their top end for operative attachment to the respective vertical ducts 110, 112 and 114 that extend away from the exhaust hood upwardly thereabove, but additionally act as a rigid housing for a respective variable positon damper plate 109 mounted within each of the exhaust collars 104, 106, 108.

A temperature sensor 136 is typically installed in each of the flanged connection collars 133 to measure the temperature of the exhaust gasses as they pass through each collar on egress from the canopy 128 of each exhaust hood 101, 102 and 103 thereby to sense the heat load being produced under the exhaust hood in which the collar is installed, and for sending a signal of this temperature via electrical connections made at junction box 148 to an electronic controller (not shown) via electric cable 149 interconnected between the junction box 148 and one or more suitably programmed CPU's and display screens (not shown) for automatic zone control as aforesaid by modulating the speed of the exhaust fan 120 and the position of the exhaust damper plate 109 mounted in the respective damper collars 104, 106, 108 in proportion to the operating temperature under the respective exhaust hoods 101, 102, 102.

It will be noted that right-most exhaust hood 101 has a single cooking appliance 130 positioned below it on floor 134, while middle exhaust hood 102 has two larger cooking appliances 130, 130 positioned below it, and left-most exhaust hood 103 has two small and two large cooking appliances 130, 130, 130, and 130. The exhaust hoods vary in lateral width to suit the number of cooking appliances used thereunder and the overall maximum exhaust load placed on each exhaust hood. Typically, such variation in lateral width is between about 3 feet to about 15 feet, and may be specially ordered in one inch lateral width increments to meet user specifications.

Depending upon the size of the prior art exhaust hood utilized and the total planned exhaust load, the size of the corresponding exhaust ducts and exhaust damper collars will typical vary in direct proportion. Accordingly, it will be noted in FIG. 1, that the smallest exhaust hood 101 has a proportionately smaller exhaust duct collar 104, vertical duct 110, and vertical duct section 117, as compared to the corresponding exhaust collars 106, 108 and cross-duct section 116 respectively connecting the intermediate exhaust hood 102 and the largest exhaust hood 103 to the exhaust fan 120. For this reason, a provider of prior art commercial exhaust hood systems, such as that shown in FIG. 1, must be prepared to stock and otherwise deliver to its customers a very large variety of shapes, sizes and configurations of exhaust ductwork and exhaust damper collars. The supply of various sizes and configurations of exhaust damper collars is particularly onerous from a cost and supply logistics point of view, as these generally vary in size, shape and configuration over a wider range of sizes and configurations than do the duct sizes, and are, in any event, relatively expensive items to produce and purchase, as they contain several precision fit pieces, such as, for example, fireproof damper bearing assemblies, heat resistant electrically driven damper actuators 132, and a close fitting damper plate 109 capable of blocking smoke and/or flames. Additionally, the temperature sensor 136 must be mounted in a precise and fireproof manner within each exhaust duct collar 104, 106, 108, yet be readily able to be disassembled for cleaning and maintenance. The typical vertical height of the exhaust damper collars 104, 106, 108 ranges from about 10-25 inches. They are typically rectangular in plan outline, with their longest side varying significantly in width from about 2 feet to as much as 6 feet, depending upon the width of the exhaust hood or hood section with which they are used.

Thus, in many ways, the exhaust damper collars 104, 106, 108, rank among the most critical, expensive and delicate components of prior art zone controlled commercial kitchen exhaust hood systems. Moreover, because of the critical tolerances to which the components, particularly the moving components, of the exhaust damper collars 104 must be manufactured to ensure safety and reliability in operation, they are subject to being damaged in shipment to installation sites, which shipment is typically in a separate container from the exhaust hood upon which the damper collar 104 will be installed on site. There are also potential installation delays that can occur where one package arrives without the other.

FIG. 2 further illustrates a rectangular grease filter 143 that extends in angled relation across the egress air path between upper 150a and lower 150b support brackets. The grease filter 143 is removable for maintenance and cleaning from its operative position atop the brackets 150a, 150b, and is advantageously constructed of stainless steel mesh and/or overlapping curved plate sections that trap grease entrained in the exhaust air as it passes through the plates on its way to the exhaust port 119. Also conventional is the provision of a removable grease collection cup 148 centrally positioned on the lower support bracket 150b to catch excess grease that may drip from the grease filter 147 onto the lower bracket 150b.

Figure 3:
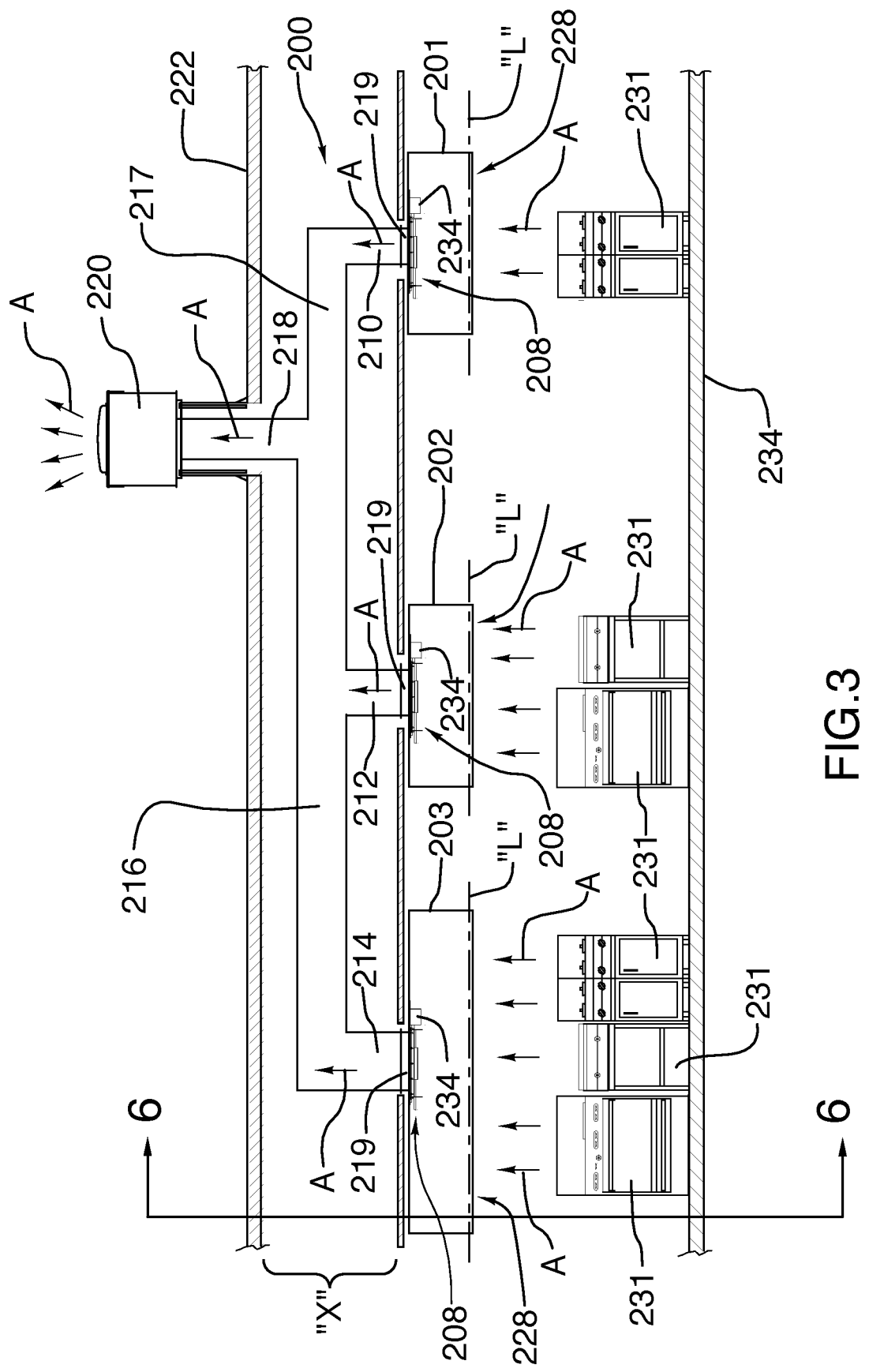
FIG. 3 is a diagrammatic front elevation of a commercial kitchen exhaust hood system wherein each of the three exhaust hoods illustrated are fitted with a damper assembly according to the present invention.

Turning to the present invention, there is illustrated schematically in FIG. 3 a zone controlled commercial kitchen exhaust hood system 200 having three exhaust hoods 201, 202 and 203. Each of the exhaust hoods 201, 202 and 203 defines a major axis "L" that spans the lateral width of each hood and each exhaust hood incorporates a damper assembly 208 according to the present invention.

Similarly to the prior art system 100 of FIGS. 1 and 2, the zone-controlled commercial kitchen exhaust hood system schematically illustrated in FIG. 3 shows a right-most exhaust hood 201 having a single cooking appliance 231 positioned below it on floor 234, while middle exhaust hood 202 has two cooking appliances 231, 231 positioned below it, and left-most exhaust hood 203 has three cooking appliances 231, 231, 231 positioned below it, with the exhaust hoods varying in lateral width to suit the number of cooking appliances used thereunder and the overall maximum exhaust load placed on each exhaust hood.

A rectangular grease filter 243 (shown only in phantom outline in FIGS. 4, 5A-5D, 6-7 and 9) that is identical in structure and function to that used in the prior art system 100 is also utilized in the same general way in the embodiment illustrated in FIGS. 3-13. Accordingly, this grease filter 243 extends in angled relation across the egress air path between upper 250a and lower 250b support brackets. The grease filter 243 is removable for maintenance and cleaning from its position atop the brackets 250a, 250b. In similar fashion to the embodiment of FIGS. 1 and 2, a grease collection cup 247 may be centrally positioned on the lower support bracket 250b to catch excess grease that may drip from the grease filter 243 to the lower bracket 150b.

Figure 4:
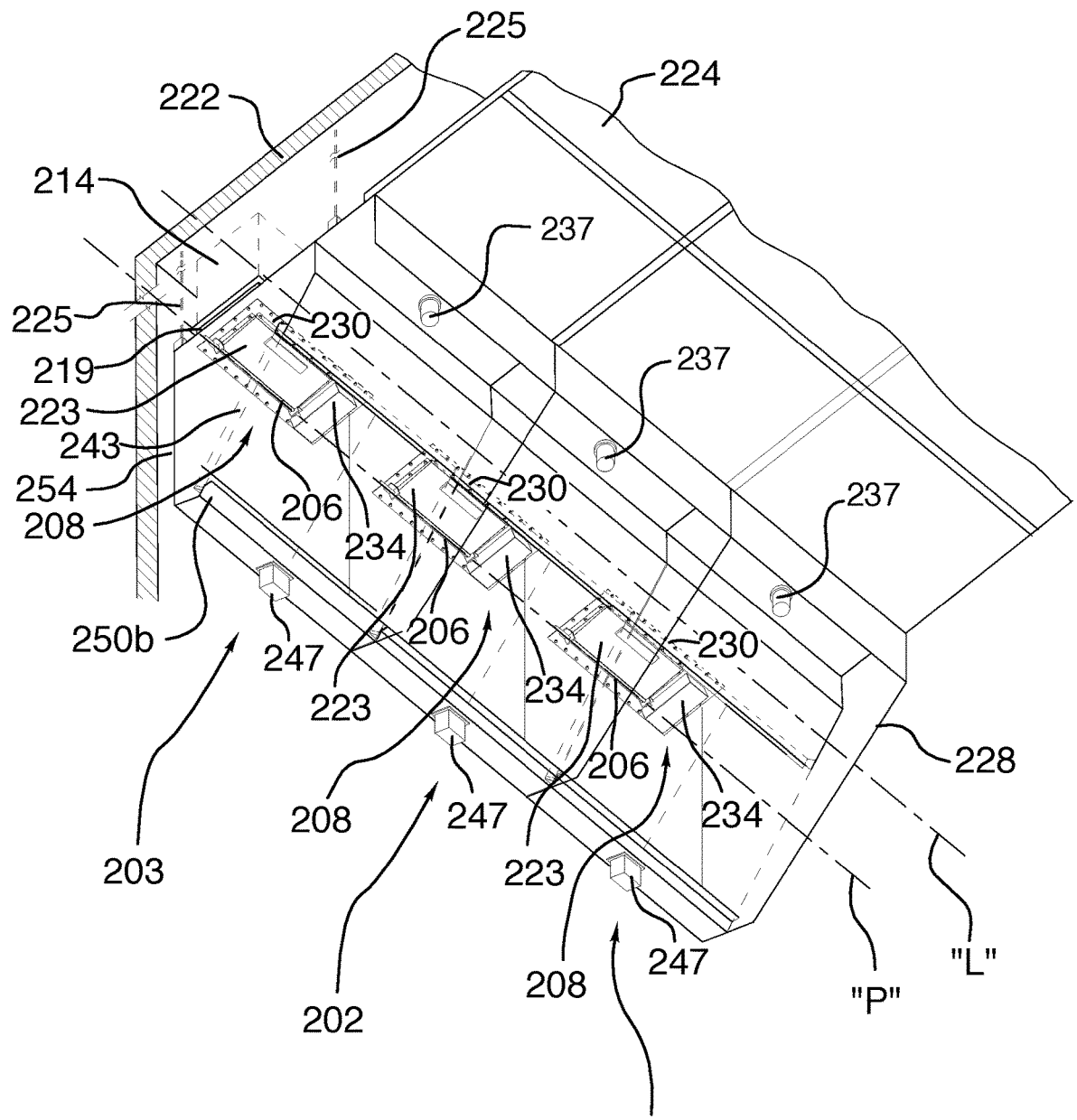
FIG. 4 is a bottom front perspective view, partly in section, of a commercial exhaust hood have three exhaust hood sections positioned adjoining one another, with each exhaust hood section having a fitted with a damper assembly according to the present invention.

The three damper assemblies 208, 208, 208 shown within each of the three exhaust hoods 201, 202 and 203 in FIG. 3, and in perspective within the three exhaust hood sections 201, 202 and 203 in FIG. 4 are identical in shape, size, configuration and function in all material respects and will be interchangeably referred to hereinbelow as "exhaust hoods" only.

Also, for ease of description and illustration, the damper assemblies 208, 208 and 208 will, where convenient to do so, be described hereinbelow in detail with reference being made only to the damper assembly 208 installed in the exhaust hood section 203 depicted to the left of FIG. 4, it being expressly understood by those skilled in the art that the structures, configurations and functions so described will be substantially the same in relation to the each of the other damper assemblies illustrated in the figures.

As seen in FIG. 3, the exhaust hoods 201, 202 and 203 are each operatively connected to respective vertical ducts 210, 212 and 214, which vertical ducts are in fluid communication with horizontal cross-duct sections 216 and 217, which cross-duct sections 216, 217 connect by means of a vertical stack 218 passing through a roof structure 222 with a single exhaust fan 220 mounted atop the roof structure 222.

The exhaust hoods 201, 202, 203, the vertical ducts 210, 212, 214, and the horizontal cross-duct sections 116, 117 are all typically suspended from, or otherwise attached to, the underside of the roof structure 122, or to an intervening floor structure in a multi-story building (not shown), by threaded hanger rods 225 or by any other conventional mounting means, such as metal strapping or the like (not shown) in the same general manner as the exhaust system of FIGS. 1 and 2.

Figure 6:
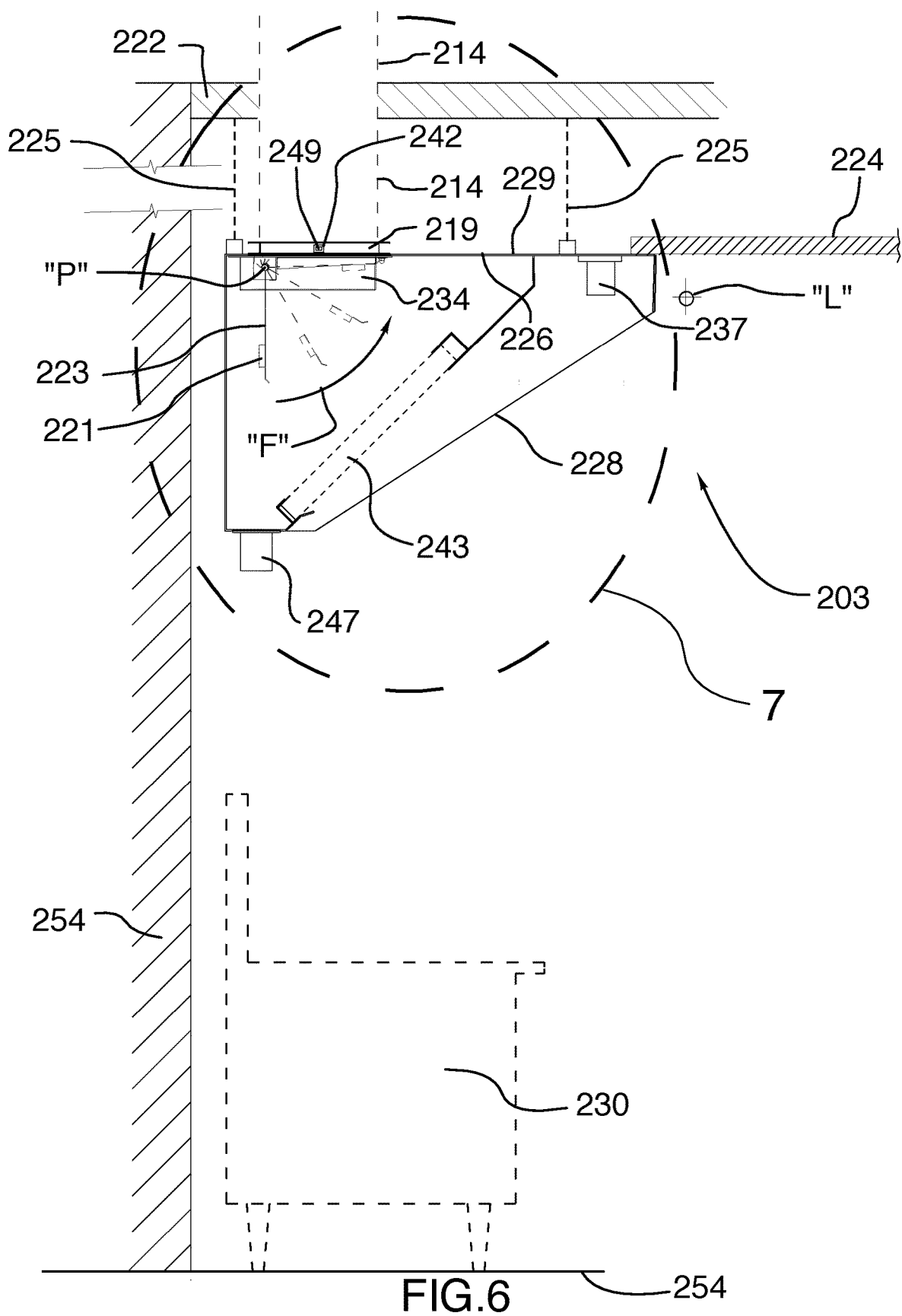
FIG. 6 is a sectional view along sight line 6-6 of FIG. 3.
Figure 7:
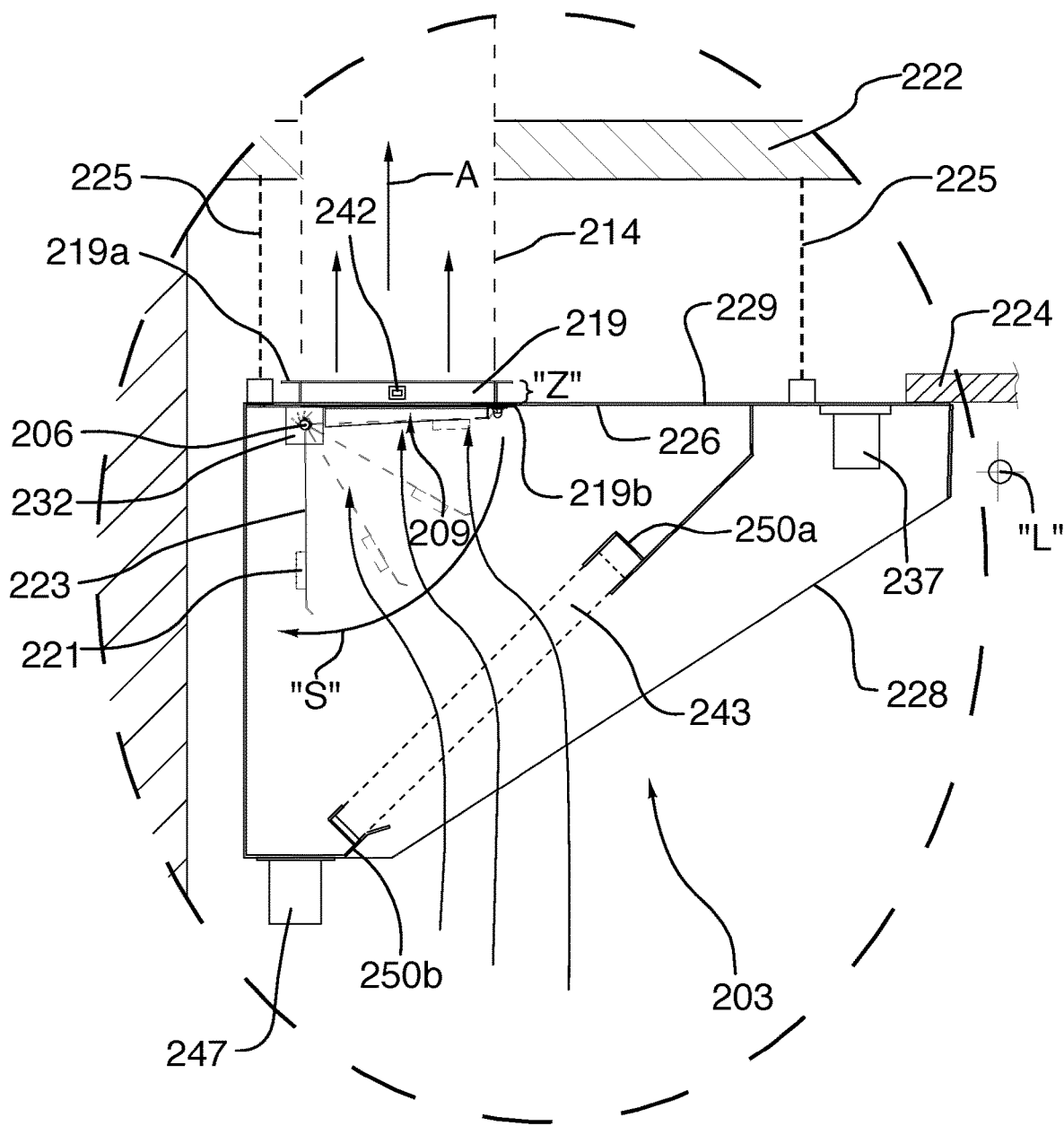
FIG. 7 is an enlarged view of the encircled area 7 shown in dashed outline in FIG. 6.

However, as the damper assemblies 208, 208 and 208 are each mounted below the upper wall 226 of their respective exhaust hoods 201, 202 and 203, there is no requirement for an exhaust damper collar (equivalent to the damper collar 108 of the prior art systems illustrated in FIGS. 1 and 2) to be mounted above the upper wall 226 of the exhaust hood 203. Rather, in place of such a complicated, expensive and prone to being damaged in shipment exhaust damper collar 108, there may be provided a rather simple and inexpensive flanged connection collar 219, as best seen in FIGS. 6 and 7. This flanged connection collar 219 surrounds an exhaust port 209 which passed through a top surface 229 of the upper wall 226 of the exhaust hood 203, and preferably has a tipped "U"-shaped cross-section, with a top flange portion 219a connected to the vertical duct 214 (shown in phantom outline) and a lower flange portion 219b connected to the top surface 229 of the upper wall 226 of the exhaust hood 203. The preferred mode of such connection, for both flange portions 219a and 219b, is continuous welding, although any other suitable means of attachment that meets local fire codes is acceptable. The vertical height "Z" of the flanged connection collar 219 (best seen in FIG. 7) is between about 2-4 inches (which is substantially the same height as the flanged connection collar 133 used in the prior art), as compared to a vertical height "Y" of about 12-25 inches for the exhaust damper collars 104, 106 and 108 as described above in relation to FIGS. 1 and 2.

Accordingly, it will be appreciated that by eliminating a conventional exhaust damper collar 108 from placement above an exhaust hood and replacing it with a damper assembly 208 and flanged connection collar 219 according to the present invention, the vertical distance "X" shown in FIG. 1 (being the vertical distance "X" between the top surface 126 of the mounting hoods 101, 102 and 103 and the underside of the roof structure 122 or of an intervening floor structure in a multi-story building) can be reduced by as much as 25 inches (being the distance "X" minus the distance "Y" from FIG. 1). Thus, it can be seen in FIG. 3 that the vertical height "X" is considerably shorter that the same vertical height "X" in the prior art system of FIG. 1. This reduction in vertical height can result in significant savings in design and construction costs of the building housing the system 200, particularly where the roof structure 222 (or floor structure of a multi-story building) is constructed from concrete and/or extends beyond the kitchen area where the system 200 is installed.

The zone-controlled commercial kitchen exhaust hood system 200 of FIGS. 3-15 may, as with the prior art exhaust system 100 illustrated in FIGS. 1 and 2, also optionally incorporate a conventional replacement air delivery system to replace air exhausted by the exhaust hood system from the kitchen area with fresh outside air, which system would be substantially as illustrated in these earlier figures. However, for brevity and ease of illustration, such a replacement air delivery system is not illustrated in FIGS. 3-15 and will not be described hereinbelow, it being readily apparent to those skilled in the art what further modifications and additions would be required to incorporate such a replacement air delivery system into the exhaust hoods 201, 202 and 203.

One or more lights 237 are also advantageously included within the exhaust hood system 200 as shown in FIGS. 3-7 by being mounted within the canopy 128 of each of the exhaust hood/hoods sections 201, 202 and 203 to improve visibility under the canopies 128 for those working on the cooking appliances 231 positioned thereunder.

A decorative false ceiling, such as, for example, a T-bar ceiling 224, may be suspended above the top surface 229 of the upper wall 226 of the exhaust hoods 201, 202 and 203, with the flanged connection collar 219 being positioned above the level of the false ceiling 224.

Figure 12:
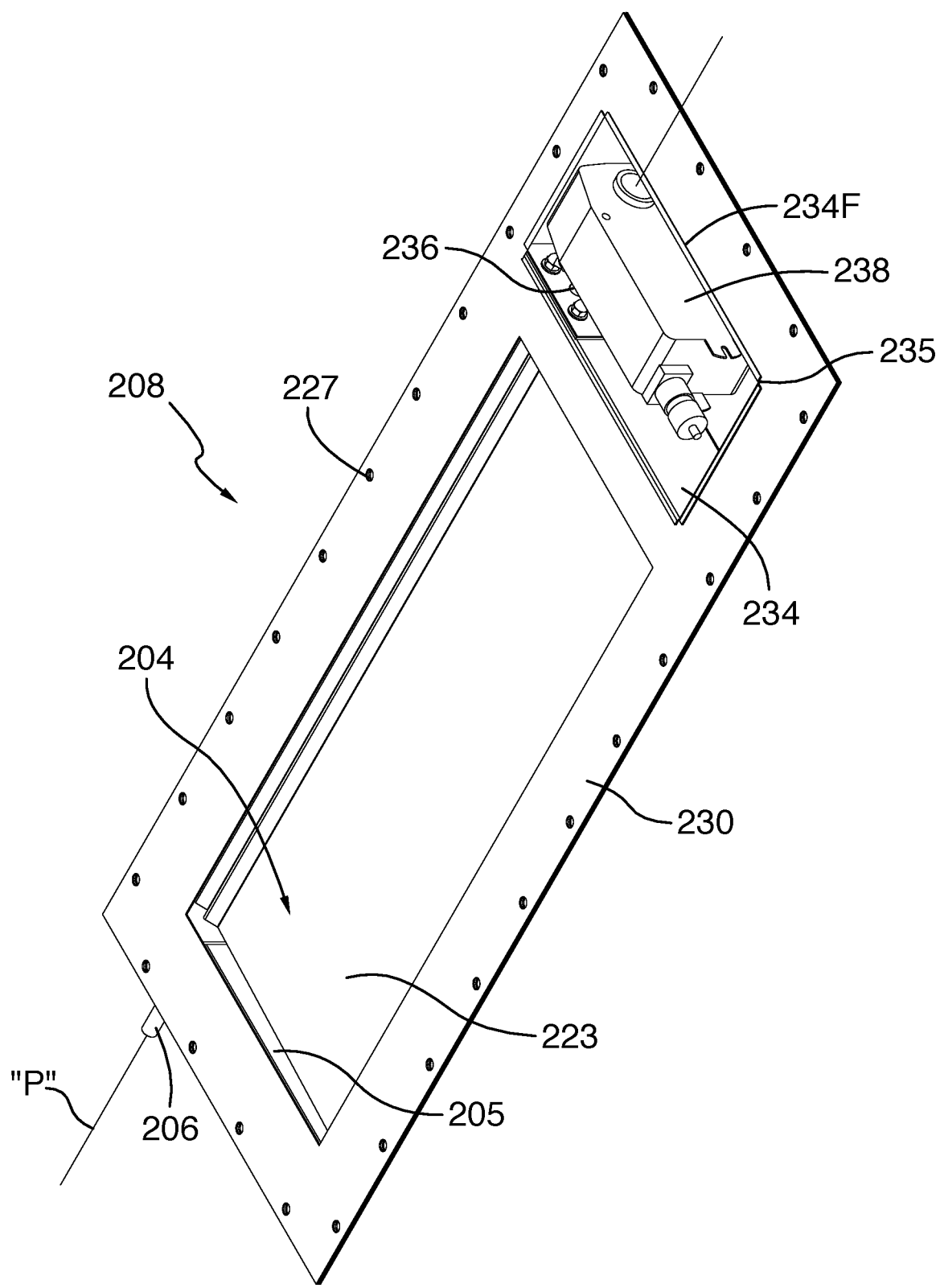
FIG. 12 is a top perspective view of the variable damper assembly shown in 8A; and, FIG. 13 is an exploded view of the variable damper assembly of FIG. 12.
Figure 13:
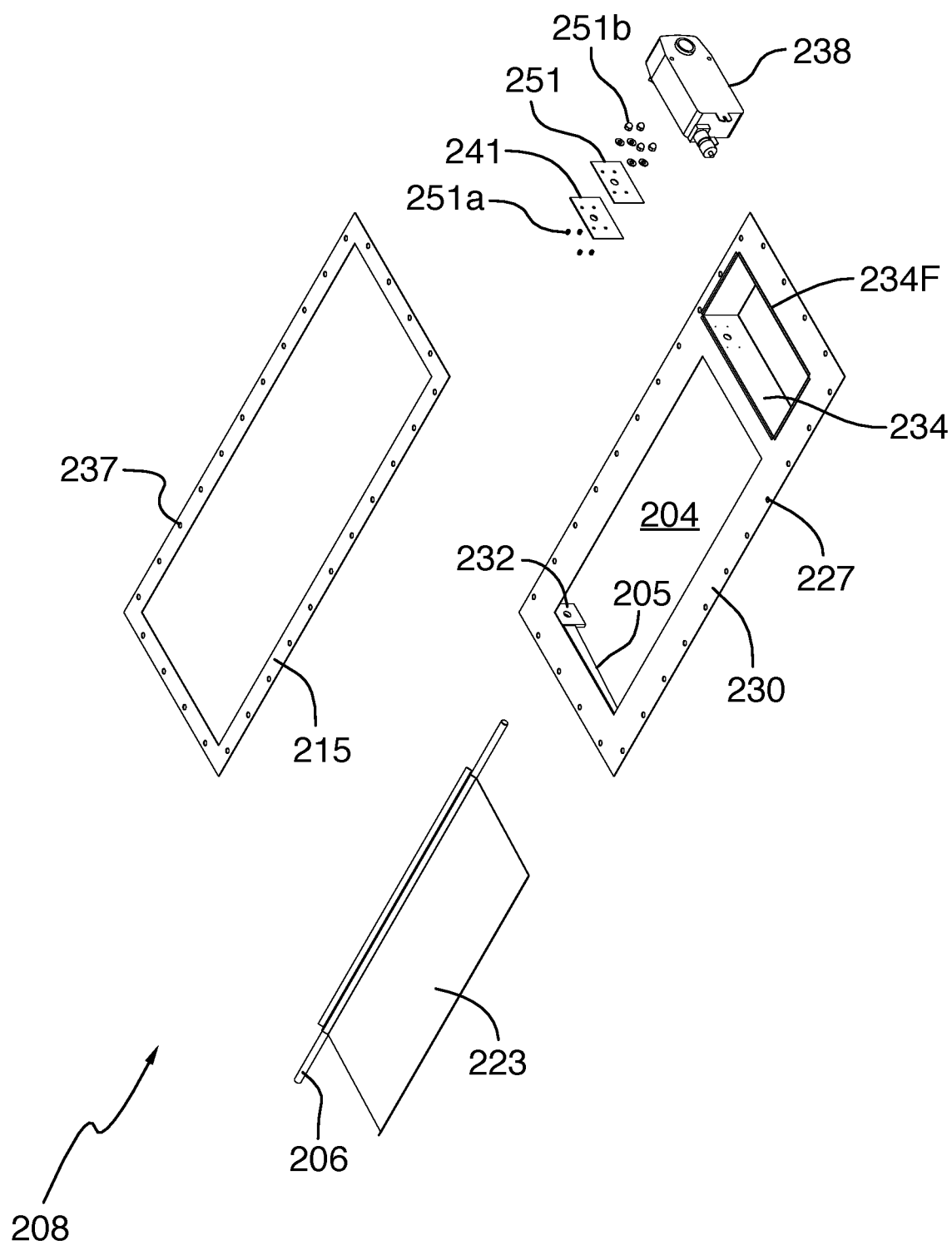

As best seen in FIGS. 12 and 13, each damper assembly 208 comprises a mounting plate 230 having a central opening 204 passing therethrough. The shape of the mounting plate 230 and central opening 204 are both preferably congruent, being of quadrilateral, and still more preferably, of rectangular plan outline, as will be seen best in FIGS. 5B, 12 and 13, with the long sides of the rectangle being generally parallel to the major axis "L" when the system 200 is assembled, although such shape and configuration is not essential to the invention.

Figure 11:
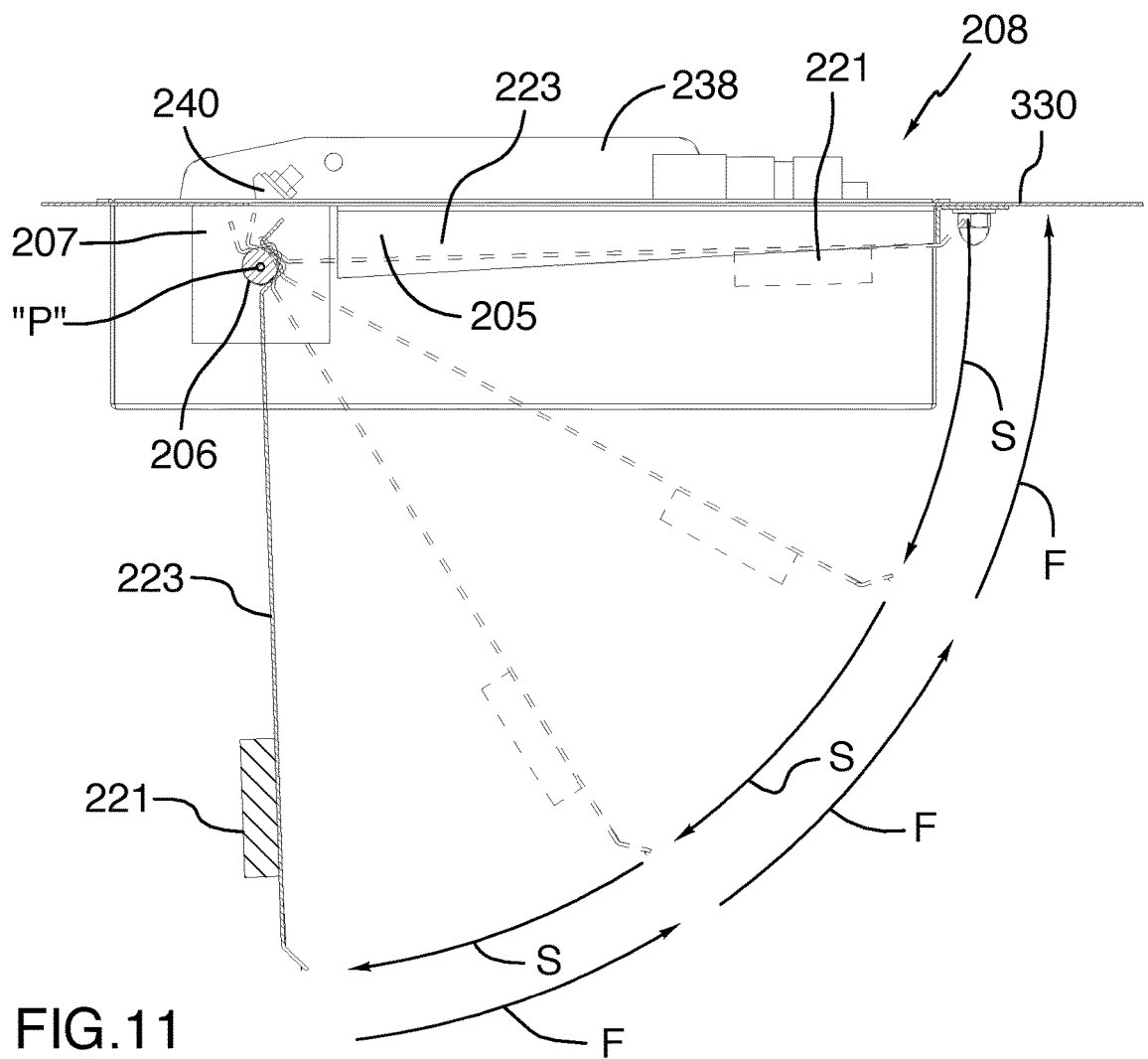
FIG. 11 is a sectional view along sight line 11-11 of FIG. 8B, with the damper plate shown in solid outline in its first limit position and in several other positions in phantom outline.

A damper plate 223 is mounted on the mounting plate 230 for selective pivotal movement about a pivot axis "P" in a first rotational direction indicated by arrows "F" in FIGS. 6 and 11 between a first limit position (shown in solid outline in FIGS. 5B, 5C, 5D, 6, 7 and 11) whereat the damper plate 223 is fully removed from occluding the central opening 204 so as to permit the free flow of exhaust gasses through the exhaust port 209, positioned directly above the central opening 204, towards a second limit positon that is preferably but not essentially transverse to the first limit position, as illustrated in solid outline in FIGS. 4, 5A, 5, 5, 6, 8A, 8B, 9, 10, and 12 and in phantom outline in FIGS. 6, 7 and 11, at which second position the damper plate 223 occludes the central opening 204 so as to substantially restrict the flow of exhaust gasses through the exhaust port 209. The damper plate 223 is also mounted and otherwise adapted (as more fully described herein) to rotate in a second rotational direction (indicated by arrows "S" in FIG. 11) from said second limit position towards said first limit position, with two intermediate positons being indicated in phantom outline in FIGS. 6, 7, and 11. Preferably, the pivot axis "P" is parallel to the major axis "L".

The damper plate 223 is preferably mounted for said selective pivotal movement about the pivot axis "P" by means of an axle shaft 206 affixed to the underside of the mounting plate 230 by opposed mounting ears 232, 232 and having its shaft axis coincident with the pivot axis "P". The axle shaft 206 is welded or otherwise rigidly affixed to the underside of the damper plate 223 adjacent the longer rear side edge of the damper plate, and is free to rotate in the mounting ears 232, 232, which ears 232, 232 are welded or otherwise affixed to the underside of the mounting plate 230 adjacent opposite shorter sides of the central opening 204.

A flange preferably surrounds the central opening 204 on three of its sides apart from the side adjacent the axle shaft 206 to better define and seal with the damper plate 223 in its second position. The flange may be constructed in three separate straight sections 205a, 205b and 205c, as shown, each of which sections is attached to the mounting plate 230 by machine screws 207, or any other suitable attachment means.

The damper plate 223 preferably has a counterweight 221 attached to its underside adjacent the front side edge of the damper plate 223 opposite to the axle shaft, which counterweight 221 assists the damper actuator 238 in moving the damper plate 223 in the second rotational direction "S" against the suction created by the exhaust fan 220, which movement can require a significant amount of torque, particularly when the damper plate 223 is at, or near, its second limit position and the exhaust fan 220 is at or near its full operational speed.

A drive housing 234 is attached to the mounting plate 230 adjacent an end of the axle shaft 206 in downwardly depending relation from the mounting plate 230. The drive housing 234 may be uniformly formed as one-piece with the mounting plate 230 by stamping or the like, or may be formed or otherwise fabricated as a separate component as shown, in which case it may be formed at its top open end with a perimeter flange 234f and be thereafter inserted from the top into a suitably sized aperture formed in the mounting plate 230 adjacent one end. In this manner, the perimeter flange 234f will frictionally engage the perimeter of the aperture thus formed, and the housing 234 may be continuously welded in place at the juncture of the mounting plate 230 and the drive housing 234 so as to be attached in flame resistant sealed relation one to the other to prevent the passage of flames and exhaust gasses between the drive housing 234 and the aperture 235.

The mounting plate 230 is removably attachable to the underside of the upper wall 226 of the exhaust hood 203 by means of a plurality of bolt holes 227 formed around the perimeter of the mounting plate 230 in substantially evenly spaced relation. A corresponding plurality of threaded bolts or studs 233 (see FIG. 9) extend downwardly from the upper wall 226 of the exhaust hood 203 in surrounding relation to the exhaust port 209 to mate one each with the bolt holes 227. A first flame resistant gasket 215 having a complimentary pattern of holes 237 is preferably interposed between the mounting plate 230 and the upper wall 226 of the exhaust hood to assist in sealing the mounting plate 230 to the upper wall 226 against gas and flame infiltration between the mounting plate 230 and the upper wall 226. A preferred gasket material for this purpose is GRAFOIL™ metal laminated reinforced graphite gasket material, available from Seal & Design Inc., Clarence, N.Y., 14031, USA.

Once all of the various components described herein are assembled onto the mounting plate 230 and into the drive housing 234, and the flame resistant gasket 215 is placed positioned on the threaded studs 233, the mounting plate 230 containing these components can be secured in place in said sealed relation against the upper wall 226 by tightening a respective plurality of nuts 239 onto the threaded studs 233, with the central opening 204 of the mounting plate in sealed relation with the exhaust port 209 positioned thereabove.

In the preferred embodiment illustrated in FIGS. 4-13, a drive shaft 236 extends from the drive housing 234 for operative connection to the damper plate 223 to drive the aforesaid pivotal movement of the damper plate 223 in the first "F" and second "S" rotational directions discussed above upon respective bi-directional rotation of the drive shaft 236. In the preferred embodiment illustrated in FIGS. 4-15, the axis of the drive shaft 236 is preferably coincident with the axis of the axle shaft, and still more preferably, the drive shaft 236 and the axle shaft 206 are one continuous shaft as illustrated in the embodiment illustrated in FIGS. 3-13.

Figure 8A:
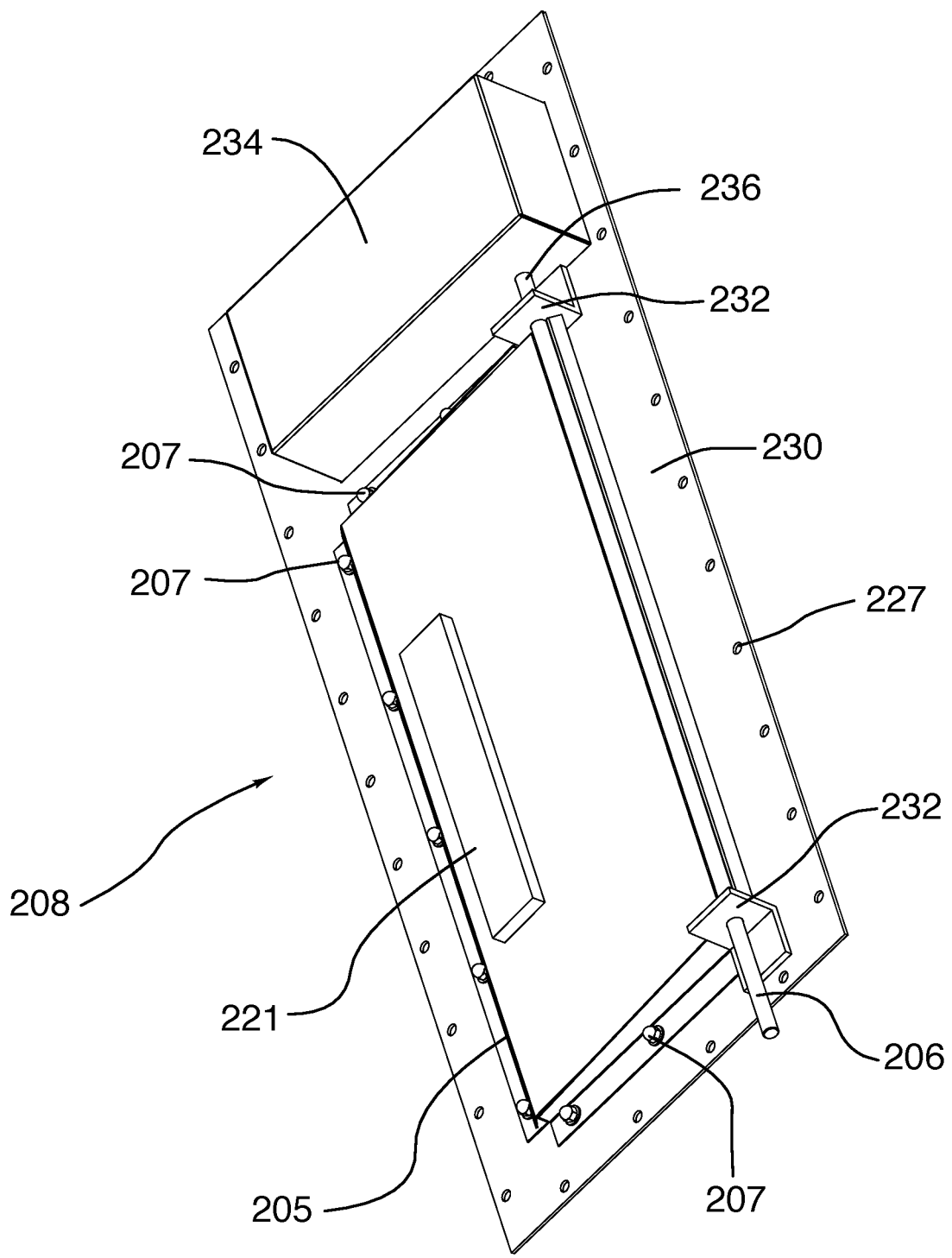
FIG. 8A is a bottom perspective view, in isolation, of the damper assembly illustrated in each of the exhaust hood sections of FIGS. 4-7, inclusive.
Figure 8B:
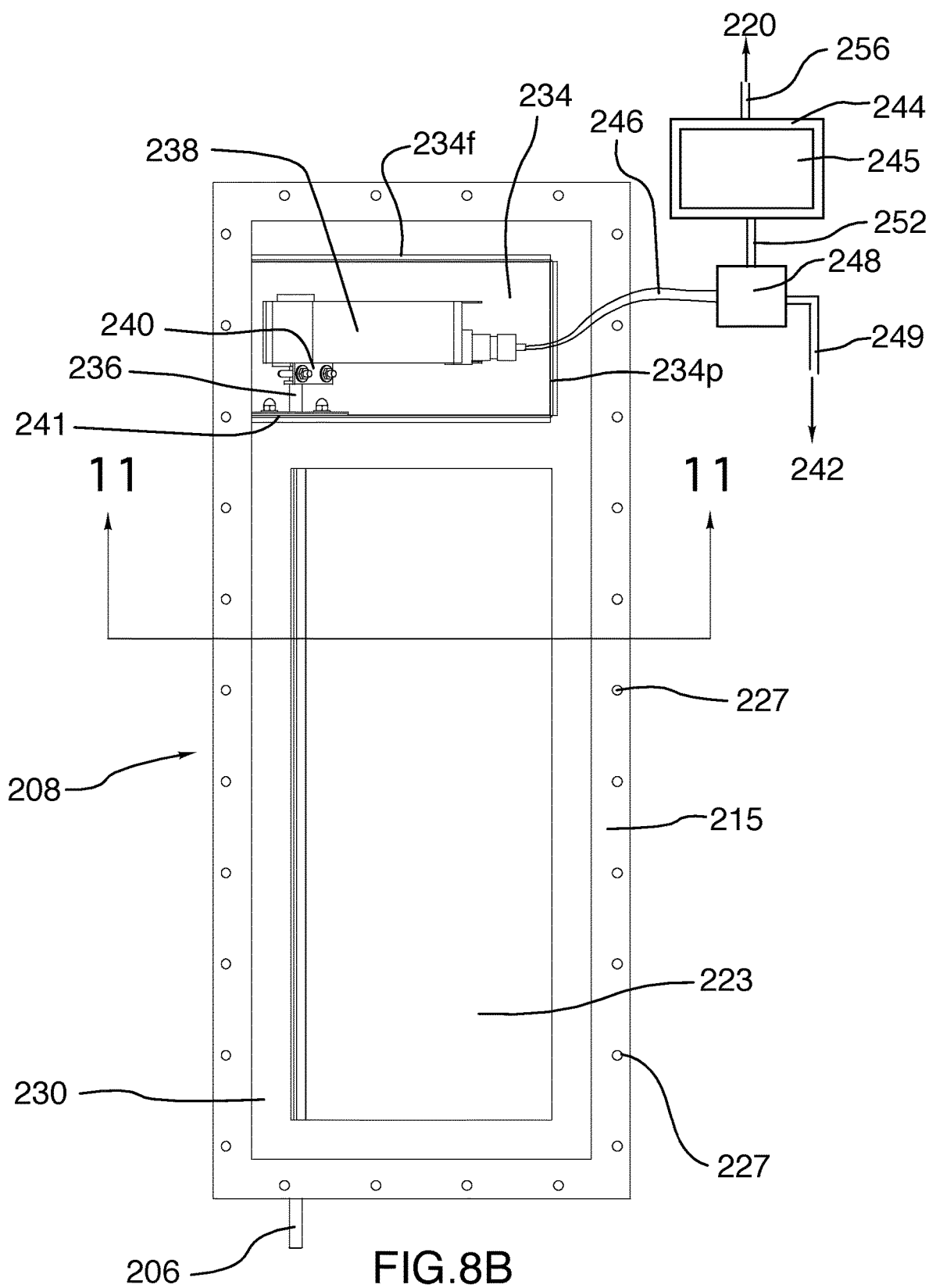
FIG. 8B is a top plan view, in isolation, of the damper assembly shown in FIG. 8A.
Figure 9:
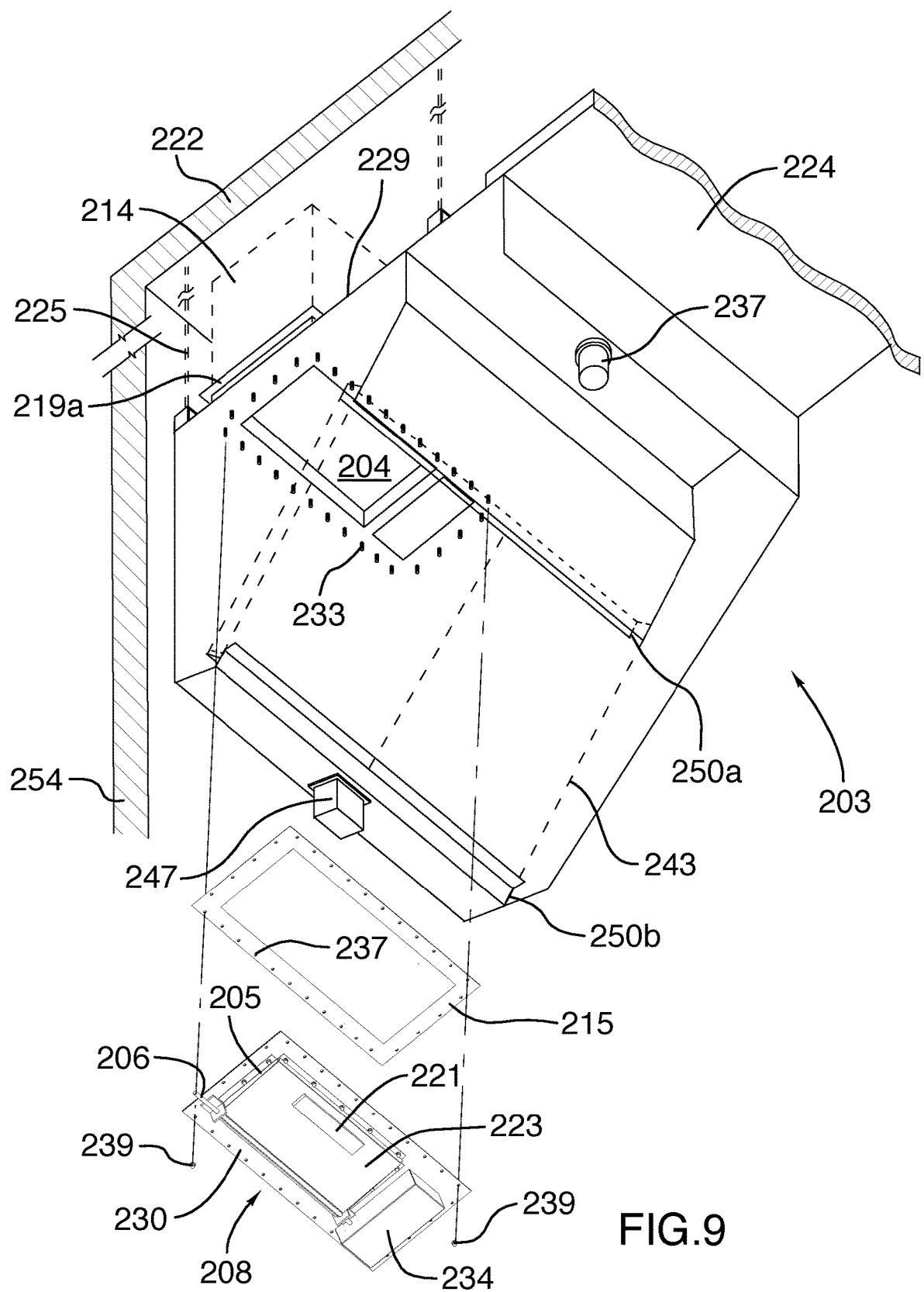
FIG. 9 is an exploded view of the exhaust hood section shown in FIG. 5A.
Figure 10:
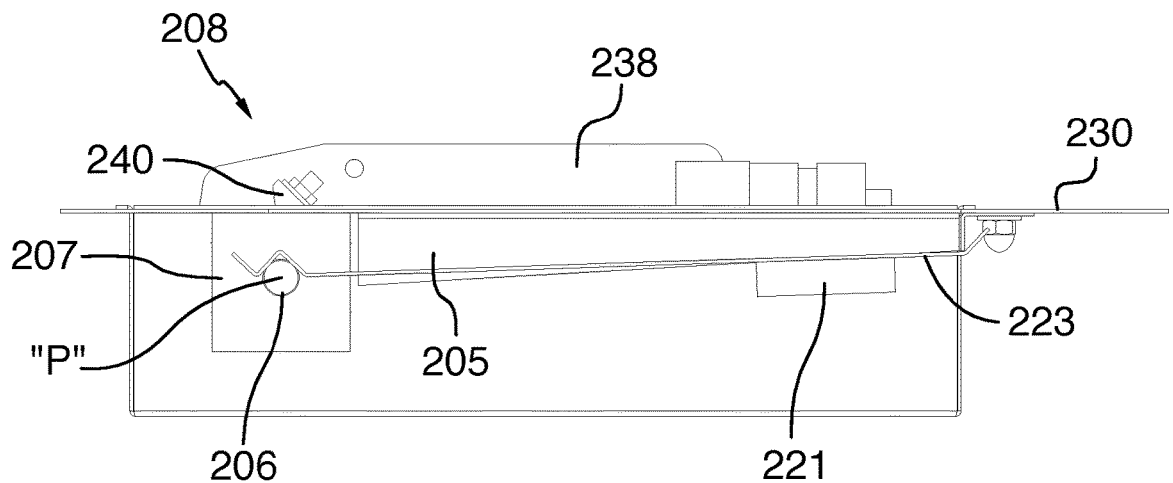
FIG. 10 is a side elevational view of the damper assembly illustrated in each of the exhaust hood sections of FIGS. 4-8B, inclusive—taken from the lateral side edge of the assembly adjacent the bottom of FIG. 8B.

An electrically driven damper actuator 238 is mounted in the drive housing 234 to cause the aforesaid bi-directional rotation of the drive shaft. The damper actuator 238 may be, for example, a Model AFB24-SR damper actuator available from Belimo Aircontrols (USA) Inc. of Danbury, Conn., 06810, USA and such a damper actuator 238 is illustrated in the embodiment illustrated in FIGS. 4-13. The damper actuator 238 is connected directly to the drive shaft 236 by means of a universal clamp 240 as best seen in FIG. 8B. A crank arm and other alternative arrangements (such as drive gears) may be used in applications (not shown) where the damper actuator 238 cannot be direct coupled to the drive shaft 236. The damper actuator 238 incorporates a spring return system that provides constant torque to the drive shaft 236 with and without electrical power supplied to the actuator 238. The actuator 238 operates in response to a 2 to 10 voltage direct current or, with the addition of a 500Ω resistor, a 4 to 20 mA control input from an electronic control means 244. A 2 to 10 voltage direct current feedback signal is provided for position indication. The damper actuator model shown provides 95° of rotation and uses a brushless direct current motor which is controlled by an Application Specific Integrated Circuit (ASIC) and a microprocessor. The microprocessor provides the intelligence to the ASIC to provide a constant rotation rate and to know the actuator's exact fail-safe position. The ASIC monitors and controls the brushless direct current motor's rotation and provides a digital rotation sensing function to prevent damage to the actuator in a stall condition. The damper actuator 238 may be stopped anywhere in its normal rotation without the need of mechanical end switches.

It is preferable that a second flame resistant gasket 241 be installed around the drive shaft 236 at the location where it extends from the drive housing 234 in order to prevent flames and excess heat from the cooking appliances 231 that has made its way up through the central opening 204 and the exhaust port 219 from entering the drive housing 234 to cause possible overheating of or damage to the drive actuator 238. As best seen in FIG. 13, the second flame resistant gasket 241 may take the form of a rectangular pad of flame resistant gasket material having a central hole that fits tightly around the outside diameter of the unitary drive shaft/axle shaft 236/206, with the gasket 241 being held in place by a complementary metal fastening plate 251 overlying the gasket 241 and holding same in place by a series of relatively small nuts 251a and bolts 251b passing in seriatim through the metal fastening plate 251, the gasket 241 and a sidewall of the drive housing 234. A preferred gasket material for constructing the second flame resistant gasket 241 is also the GRAFOIL™ metal laminated reinforced graphite gasket material referenced above.

The control means 244 is interconnected with the damper actuator 238 to selectively activate the damper actuator in a selected one of said first "F" and second "S" rotational directions. Such a control means, in its simplest form, may be a 3-position electrical switch having a first position for activating rotation of the drive shaft 236 in its first rotational direction, a second position for activating rotation of the drive shaft 236 in its second rotational direction, and a third neutral position whereat the damper actuator 238 is de-activated.

More typically, however, and as shown in the embodiment illustrated in FIGS. 3-13, the control means 244 is an advanced electronic controller having one or more suitably programmed central processing units and one or more touchscreen input video displays providing system operating parameters to users and providing for input by said users. One such control means 244, existing in the prior art, is the TRUEFLOW™ controller available from Spring Air Systems Inc. of Oakville, Ontario Canada. Further details of this system are available from this company's website at: www:springairsystems.com. In such case the interconnection between the damper actuator 238 and the control means 244 is by way of a low voltage electrical connection 246 extending between the damper actuator 238 and a junction box 248, with a further low voltage electrical connection 252 between the junction box 248 and the control means 244, as seen in FIG. 8B.

The control means 244 may be mounted, for example, on the canopy 228 of an exhaust hood 201, 202, 203, or on a wall 254 in proximity to the exhaust hood(s) controlled thereby.

A temperature sensor 242 (see FIGS. 6 and 7) is preferably installed in each of the flanged connection collars 219 to measure the temperature of the exhaust gasses as they pass through each collar on egress from the exhaust port 209 of each exhaust hood 201, 202 and 203 thereby to sense the heat load being produced under the exhaust hood in which the respective collar is installed.

The temperature sensor 242 may be, for example, a J-COUPLE™ temperature sensor available from Spring Air Systems Inc. of Oakville, Ontario Canada. The temperature sensor 242 sends a signal indicative of this temperature by way of electrical cable 249 to junction box 248. From the junction box 248, the temperature signal is sent via electrical cable 252 to the CPU's of the control means 244, which control means 244 calculates and sends a proportional control signal to the damper actuator 238 to modulate the rotational position of the damper plate 223 in response to the signal received from the temperature sensor 242. Optionally, the control means 244 may also send another control signal indicative of the temperature measured by the temperature sensor 242, by way of electrical cable 256 interconnected, between the control means 244 and the roof mounted exhaust fan 220 to modulate the speed of the exhaust fan 220.

Figure 5A:
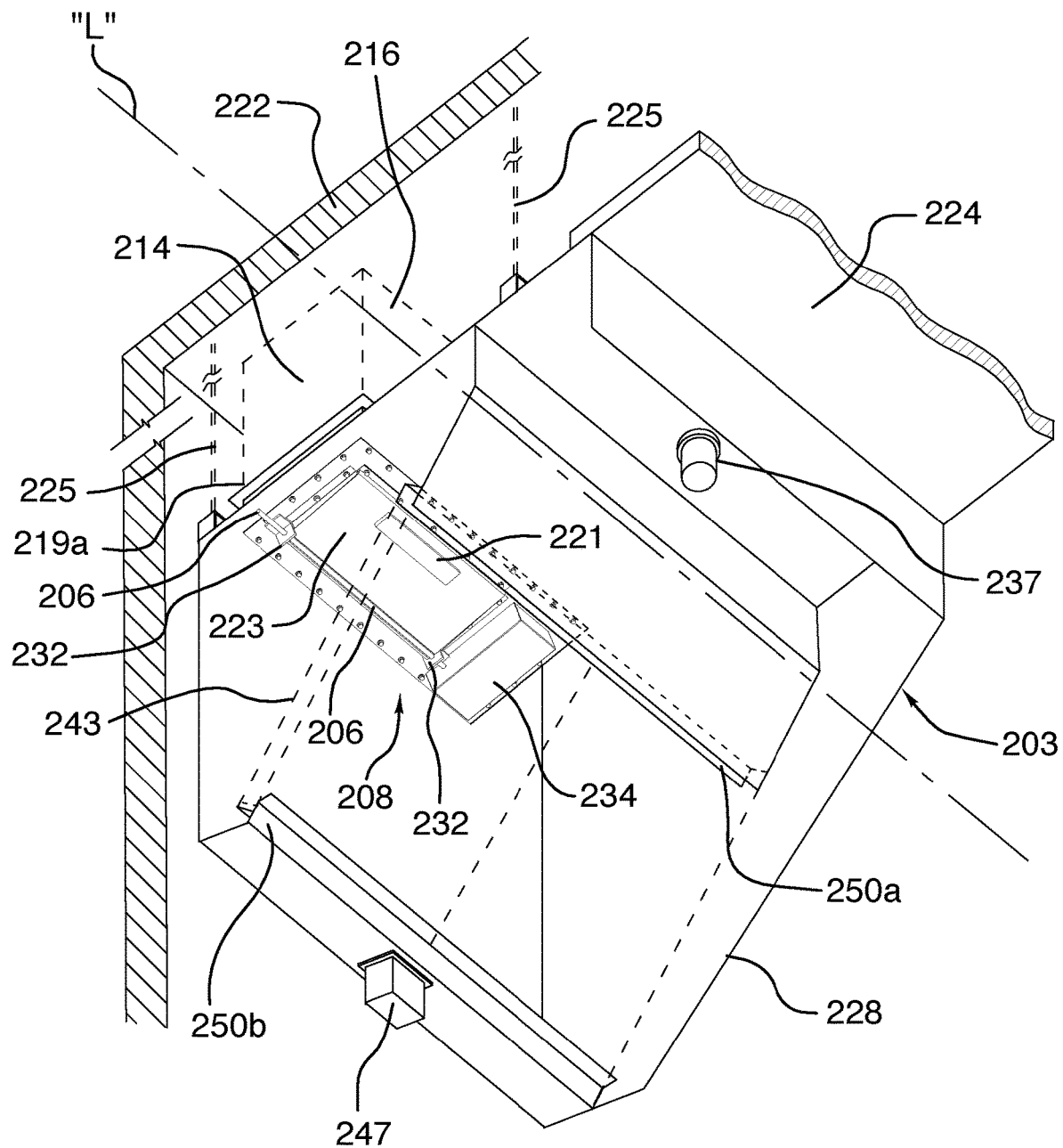
FIG. 5A is a view of the left-most exhaust hood section of FIG. 4, on a larger scale, with the damper plate of the damper assembly thereof shown in its second limit position.
Figure 5B:
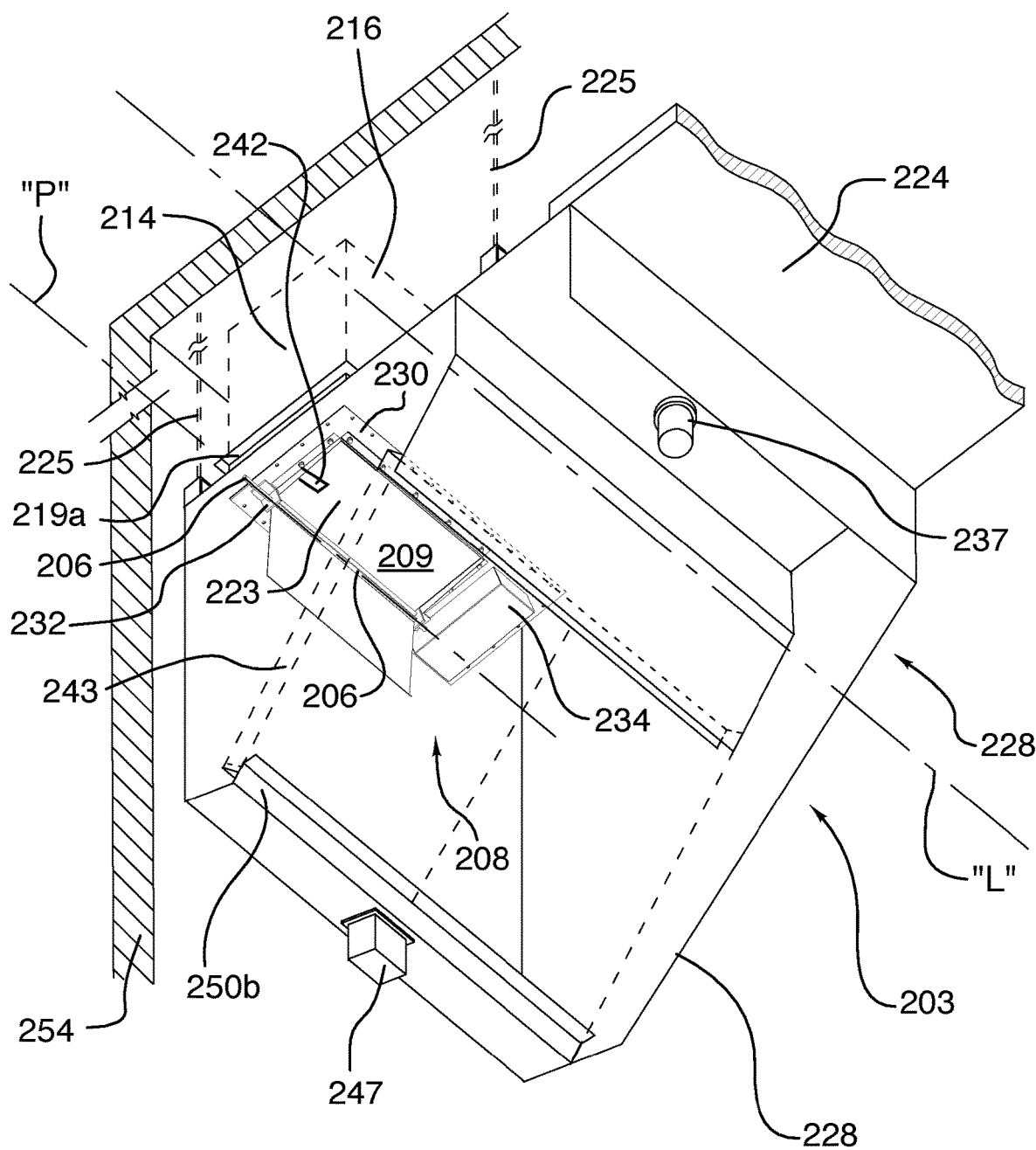
FIG. 5B is a view similar to FIG. 5A, with the damper plate of the damper assembly shown in its first limit position.
Figure 5C:
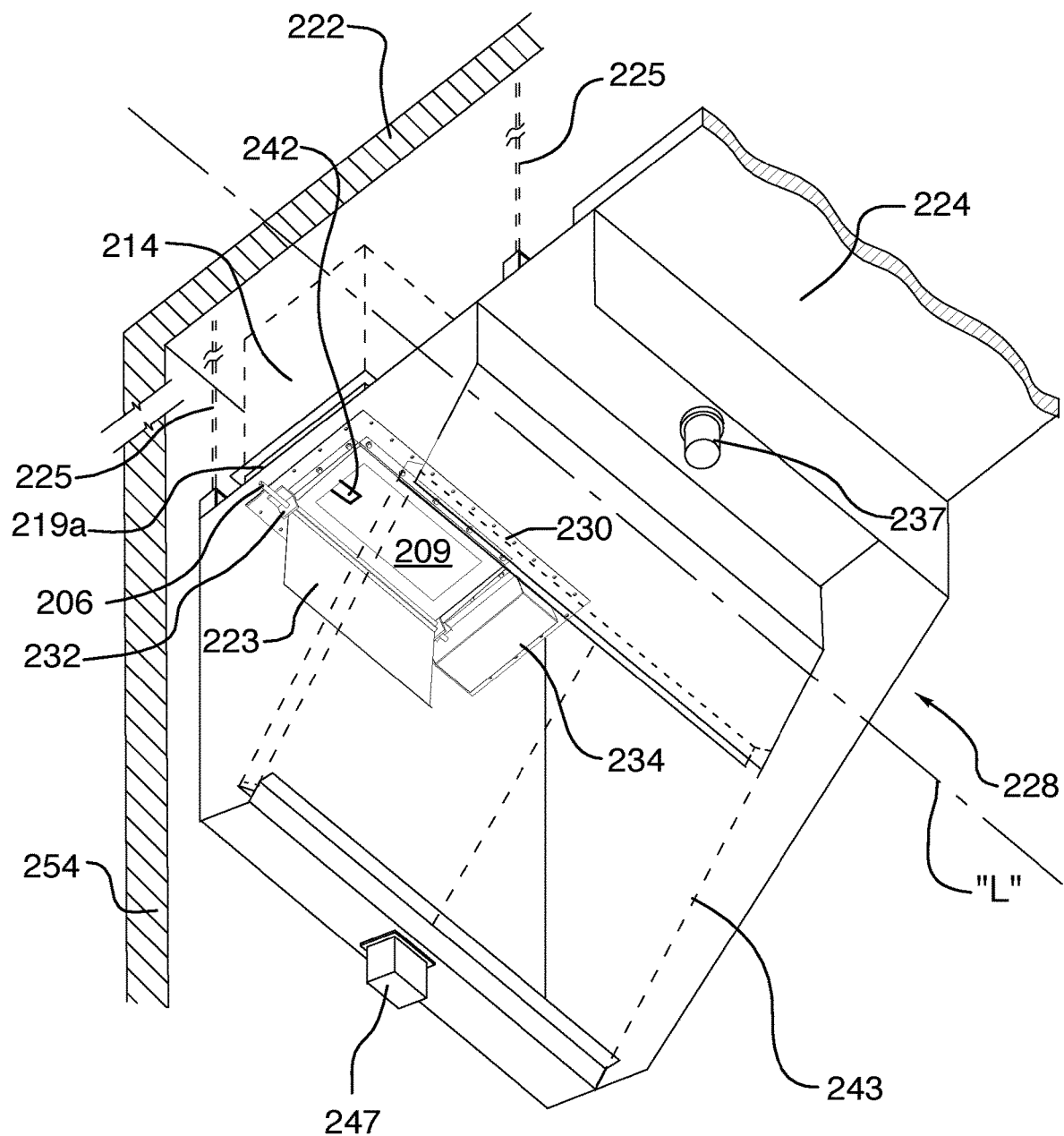
FIG. 5C is a view of the middle exhaust hood section of FIG. 4, on a larger scale, with the damper plate of the damper assembly thereof shown in its first limit position.
Figure 5D:
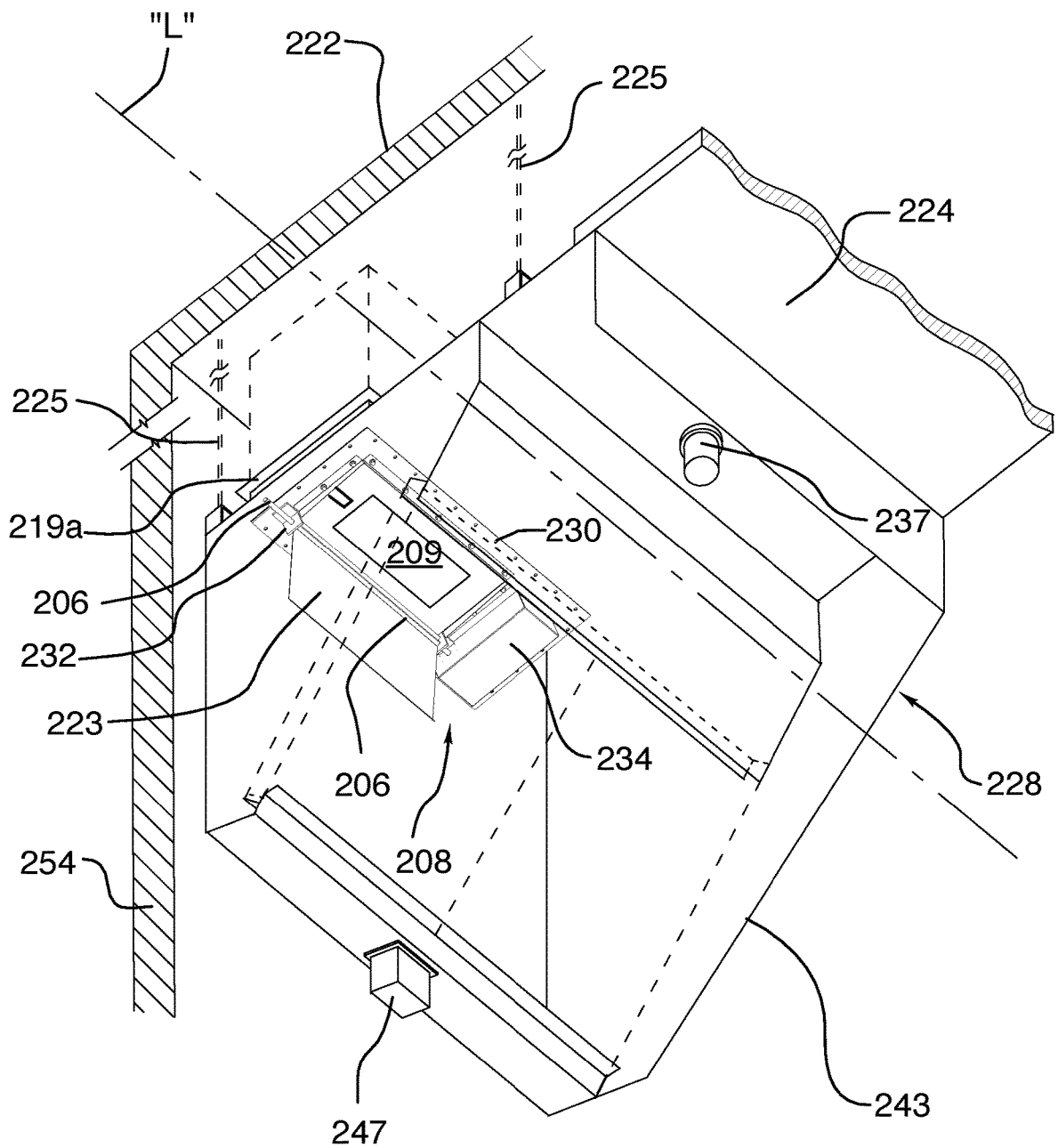
FIG. 5D is a view of the right-most exhaust hood section of FIG. 4, on a larger scale, with the damper plate of the damper assembly thereof shown in its first limit position.

In FIGS. 5B, 5C and 5D, the exhaust port 204 respectively formed in the upper wall 226 of each of the exhaust hoods 201, 202 and 203 is visible. It will be noted therefrom that the exhaust port 209 of exhaust hood 203 visible in FIG. 5B is larger in size than the exhaust port 209 of exhaust hood 202 visible in FIG. 5C, which in turn is larger in size than the exhaust port 209 of exhaust hood 201 visible in FIG. 5D, with each exhaust port 209 being proportional in area with the vertical duct 214, 212 and 210 respectively connected thereto from above (as seen in FIG. 3).

Despite this significant variation in size of the exhaust ports 209 as between the three exhaust hoods 203, 202 and 201, it will be noted that a single size and configuration of damper assembly 208 according to the present invention can accommodate many of these different size exhaust ports 209 without the need for modification of the damper assembly 208. Significant operating efficiencies and cost savings are attainable by this accommodation, as it substantially eliminates the prior art need to manufacture, to stock, and to otherwise make available to customers a large variety of shapes, sizes and configurations of exhaust damper collars 104, 106, 108. That is, a damper assembly 208 according to the present invention can be manufactured and stocked in perhaps as few as one or two sizes, and yet be usable in substantially all standard configurations or sizes of commercial exhaust hood systems. This is so as the only limiting factor for supplying damper assemblies according to the invention is that the size of the central opening 204 in the mounting plate 230 needs to be larger in each of its dimensions than the dimensions of the exhaust port 204 formed in the upper wall 226 of the target exhaust hood. In other words, the central opening 204 in the mounting plate 230 must frame the exhaust port 209 formed in the upper wall 226 of the exhaust hood in which the damper assembly 208 is to be installed.

Another significant advantage of the present invention relates to the relative ease of inspection, cleaning and maintenance of the damper assembly 208 as compared to the prior art exhaust damper collars 104, 106, 108 illustrated in FIGS. 1 and 2. All commercial kitchen exhaust hood systems accumulate significant amounts of grease and other contaminants and must, for this reason, be inspected and cleaned on a regular basis for health and safety reasons. Grease fires are a particular concern, and many institutions and jurisdiction impose strict inspection and cleaning requirements in this regard. Such requirements extend to regular cleaning and inspection of both prior art exhaust damper collars 104, 106, 108 and the exhaust damper plates 109 mounted therein, all of which are located in the prior art systems above the canopy 128 of the exhaust hoods, and, in some cases, also above a false ceiling 124, where they are much more difficult and time consuming to access and service. Moreover, to access the exhaust damper plate 109 for cleaning or inspection in such prior art systems 100, the damper actuator 132 and the damper plate assembly will typically have to be removed from the exhaust damper collar 104, 106, 108, and slid out sidewardly, from the damper collar in the confined space that typically exists above the canopy 128 of each exhaust hood 101, 102, 103. This is time consuming, tedious and difficult to accomplish, particularly where a false ceiling 124 and tall ladders are involved. Re-assembly is similarly difficult, tedious and time consuming.

The present invention substantially simplifies routine cleaning and inspection processes for the damper assembly 208, as all of the main components thereof that are exposed to the smoke, grease and other contaminants generated by the cooking therebelow, including the damper plate 223, are visible and fully accessible by cleaning or maintenance personnel from below each exhaust hood without the prior art need to disconnect or partially disassemble the damper plate 223 or the damper actuator 236 from their normal operational configurations to accomplish such routine tasks. Moreover, there is no need for cleaning or maintenance personnel to use tall ladders to access these components, or to perform these task in the confined and uncomfortable working environments that exist above the canopy 228 of the exhaust hoods. Moreover, should a damper actuator 238 require inspection or maintenance, the mounting plate 230 can be simply and easily removed from its attachment to the upper wall 226 of the exhaust hood 208 by removal of the nuts 239 that secure it thereto, and the entire sub-assembly, including the mounting plate, the damper actuator 238 and the damper plate 223, can be removed without further disassembly to a more convenient and comfortable working environment for follow-up servicing.

Another advantage of the present invention is that the damper assemblies according to the invention can, unlike in the prior art, be fully assembled within the exhaust hood(s) for which they are intended at a factory/warehouse before shipment to a customer. This practice not only reduces assembly time and convenience at the final kitchen installation site, but reduces the logistics and shipping costs required in the prior art, where it is necessary to send two separate packages for each of the exhaust hood and damper assembly. Moreover, shipping of the damper assembly mounted within the canopy of the exhaust hood provides an extra measure of protection from damage of the damper assembly and the sensitive precision-fit components contained therein.

Other modifications and alterations may be used in the design and construction of other embodiments according to the present invention without departing from the spirit and scope of the invention, which is limited only by the accompanying claims.

We claim:

1. A damper assembly for use with an exhaust port formed in an upper wall of a kitchen exhaust hood to control the egress of exhaust gasses from said exhaust hood through said exhaust port, the damper assembly comprising: a mounting plate having a central opening passing therethrough, said mounting plate being removably attachable to the underside of said upper wall in sealed relationship thereto, with said central opening in fluid communication with said exhaust port; a damper plate mounted on the mounting plate for selective pivotal movement about a pivot axis in a first rotational direction between a first limit position whereat the damper plate is fully removed from occluding the central opening so as to permit the free flow of said exhaust gasses through said exhaust port towards a second limit position whereat the damper plate occludes the central opening to substantially restrict the flow of exhaust gas through said exhaust port, and in an opposite second rotational direction from said second limit position towards said first limit position; a drive housing uniformly formed with the mounting plate, wherein said drive housing depends at least partially downwardly from said mounting plate; a drive shaft extending from said drive housing for operative connection to said damper plate to drive said pivotal movement thereof in said first and second rotational directions upon respective bi-directional rotation thereof; and a damper actuator mounted in the drive housing to cause said bi-directional rotation of the drive shaft.

2. The damper assembly of claim 1, additionally comprising a control means interconnected with the damper actuator to selectively activate the damper actuator in a selected one of said first and second rotational directions.

3. The damper assembly of claim 2, wherein the exhaust hood define a major axis and the pivot axis is parallel to said major axis.

4. The damper assembly of claim 3, wherein the damper plate is mounted for said pivotal movement about a pivot axis that is parallel to said major axis.

5. The damper assembly of claim 4, wherein the damper plate is mounted for said pivotal movement by means of an axle shaft affixed to the underside of said mounting plate with its axis coincident with said pivot axis.

6. The damper assembly of claim 5, wherein the drive housing is attached to the mounting plate adjacent one end of the axle shaft.

7. The damper assembly of claim 6, wherein the drive housing is attached to the mounting plate in flame resistant sealed relation thereto.

8. The damper assembly of claim 7, wherein the drive housing is attached to the mounting plate by continuous welding at the juncture therewith.

9. The damper assembly of claim 8, wherein a drive shaft extends from said drive housing to connect with said damper plate for driving said pivotal movement thereof.

10. The damper assembly of claim 9, wherein the axis of drive shaft is coincident with the axis of the axle shaft.

11. The damper assembly of claim 10, wherein the drive shaft and the axle shaft are a continuous shaft.

12. The damper assembly of claim 11, wherein the damper actuator is electrically driven.

13. The damper assembly of claim 12, wherein the control means comprises one or more suitably programmed central processing units ("CPU's") interconnected with one or more temperature sensors to modulate the rotational position of the damper plate in response to temperature signals received from said temperature sensor.

14. The damper assembly of claim 13, wherein said control means also modulates the speed of an exhaust fan interconnected with said control means in response to said temperature signals.

15. The damper assembly of claim 13, wherein said control means further comprising one or more touchscreen input video displays.

16. The damper assembly of claim 2, wherein the control means comprises a three-position electrical switch having a first position for activating rotation in said first rotational direction, a second position for activating rotation in said second rotational position and a neutral position whereat said damper actuator is de-activated.

17. The damper assembly of claim 11, wherein said damper plate is of quadrilateral plan outline, with said pivot axis being parallel to a selected one side edge of said damper plate.

18. The damper assembly of claim 17, wherein said damper plate is of rectangular plan outline with said selected one side edge of the plate being one of the longer side edges of the damper plate.

19. The damper assembly of claim 18, wherein a counterweight is attached to the damper plate adjacent said other one of the two longer side edges thereof.

20. The damper assembly of claim 19, wherein said counterweight is attached to the underside of the damper plate.

21. The damper assembly of claim 1, further comprising a first flame resistant gasket interposed between the mounting plate and the upper wall of the exhaust hood.

22. The damper assembly of claim 21, further comprising a second flame resistant gasket installed around the drive shaft where it extends from the drive housing.

23. The damper assembly of claim 1, wherein the damper assembly is fully assembled within the kitchen exhaust hood before shipment to a customer.

* * * * *